(12) United States Patent
Roman et al.

(10) Patent No.: US 9,602,230 B2
(45) Date of Patent: Mar. 21, 2017

(54) ESTIMATING CHANNEL INFORMATION

(71) Applicant: Nvidia Corporation, Santa Clara, CA (US)

(72) Inventors: Timo Roman, Helsinki (FI); Tommi Koivisto, Helsinki (FI); Tero Kuosmanen, Helsinki (FI); Pekka Janis, Helsinki (FI)

(73) Assignee: Nvidia Corporation, Santa Clara, CA (US)

( * ) Notice: Subject to any disclaimer, the term of this patent is extended or adjusted under 35 U.S.C. 154(b) by 122 days.

(21) Appl. No.: 14/656,810

(22) Filed: Mar. 13, 2015

(65) Prior Publication Data

US 2015/0270917 A1    Sep. 24, 2015

(30) Foreign Application Priority Data

Mar. 21, 2014 (GB) .................................. 1405117.1

(51) Int. Cl.
```
G01R 31/08      (2006.01)
H04J 11/00      (2006.01)
H04B 7/06       (2006.01)
H04W 24/08      (2009.01)
H04B 7/04       (2006.01)
```

(52) U.S. Cl.
CPC .......... *H04J 11/005* (2013.01); *H04B 7/0417* (2013.01); *H04B 7/0626* (2013.01); *H04W 24/08* (2013.01)

(58) Field of Classification Search
CPC ... H04J 11/055; H04B 7/0417; H04B 7/0626; H04W 24/08
See application file for complete search history.

(56) References Cited

U.S. PATENT DOCUMENTS

| 5,425,030 A * | 6/1995 | Comroe | ................ | H04W 16/14 370/336 |
|---|---|---|---|---|
| 2008/0019168 A1* | 1/2008 | Lin | ........................ | G11C 11/15 365/158 |
| 2008/0186942 A1* | 8/2008 | Nakayasu | ............. | H04W 72/12 370/345 |

(Continued)

OTHER PUBLICATIONS

Bai, D., et al., "Near ML Modulation Classification," IEEE, 2012, Mobile Solutions Lab, Samsung US R&D Center, San Diego, CA, 5 pages.

(Continued)

*Primary Examiner* — Robert Wilson

(57) ABSTRACT

Disclosed is a method of providing channel state information for a desired downlink channel of a wireless communication system. In a configuration phase, the method comprises receiving on a signaling channel configuration information comprising an identifier of an interference source and an association which associates the identifier with at least one resource element not used for transmission on the desired downlink channel. In an estimation phase, the method comprises estimating channel state information for an expected transmission on the desired downlink channel accounting for an incoming interference transmission from the identified interference source as observed from the at least one resource element. In a reporting phase, the method comprises reporting the channel state information.

20 Claims, 16 Drawing Sheets

(56) References Cited

U.S. PATENT DOCUMENTS

| | | | |
|---|---|---|---|
| 2008/0227422 A1* | 9/2008 | Hwang | H04B 7/0452 455/278.1 |
| 2009/0082057 A1* | 3/2009 | Hwang | H04W 52/242 455/522 |
| 2010/0157901 A1 | 6/2010 | Sanderovitz et al. | |
| 2011/0003598 A1 | 1/2011 | Ma et al. | |
| 2011/0080965 A1 | 4/2011 | Liu et al. | |
| 2011/0317748 A1 | 12/2011 | Li et al. | |
| 2012/0170555 A1 | 7/2012 | Wilson et al. | |
| 2013/0077514 A1 | 3/2013 | Dinan | |
| 2014/0086084 A1* | 3/2014 | Bi | H04L 1/0026 370/252 |
| 2015/0270917 A1* | 9/2015 | Roman | H04J 11/005 370/329 |

OTHER PUBLICATIONS

RP-130404, "Study on Network-Assisted Interference Cancellation and Suppression for LTE," 3GPP TSG RAN Meeting #59, Feb. 26-Mar. 1, 2013, 7 pages, Vienna, Austria.

"3rd Generation Partnership Project; Technical Specification Group Radio Access Network; Coordinated Multi-Point Operation for LTE Physical Layer Aspects, (Release 11)" 3GPP TR 36.819, vol. 11.2.0, Sep. 2013, 70 pages.

R4-136207, "Discussion on interference parameters signalling and detection for NAICS," 3GPP TSG-RAN WG4 Meeting # 69, Nov. 11-15, 2013, 16 pages, San Francisco, CA.

"3rd Generation Partnership Project; Technical Specification Group Radio Access Network; Evolved Universal Terrestrial Radio Access (E-UTRA); Physical Channels and Modulation (Release 12)," 3GPP TS 36.211, vol. 12.0.0, Dec. 2013, 120 pages.

"3rd Generation Partnership Project; Technical Specification Group Radio Access Network; Evolved Universal Terrestrial Radio Access (E-UTRA); Physical layer procedures (Release 12)," 3GPP TS 36.213, vol. 12.0.0, Dec. 2013, 186 pages.

"3rd Generation Partnership Project; Technical Specification Group Radio Access Network; Network-Assisted Interference Cancellation and Suppression for LTE (Release 12)," 3GPP TR 36.866, vol. 2.0.0, Feb. 2014, 64 pages.

R4-140608, "Discussion on Interference Signal Modulation Format Detection for NAICS," 3GPP TSG-RAN WG4, Meeting #70, Feb. 10-14, 2014, 8 pages, Prague, Czech Republic.

R1-140614, "Signaling in NAICS," 3GPP TSG-RAN WG1, Meeting #76, Feb. 10-14, 2014, 6 pages, Prague, Czech Republic.

R1-140803, "System Level Evaluations for NAICS," 3GPP TSG-RAN WG1#76, Feb. 10-14, 2014, 2 pages, Prague, Czech Republic.

RP-140431, "New Work Item Proposal for Network Assistance Interference Cancellation and Suppression for LTE," 3GPP TSG RAN, Meeting #63, Mar. 3-6, 2014, 7 pages, Fukuoka, Japan.

"3rd Generation Partnership Project; Technical Specification Group Radio Access Network; Evolved Universal Terrestrial Radio Access (E-UTRA); User Equipment (UE) Radio Transmission and Reception (Release 12)," 3GPP TS 36.101, vol. 12.6.0, Dec. 2014, 589 pages.

"Discussion on CQI calculation methods for NAICS," 3GPP TSG RAN WG1 Meeting #76, R1-140343, Feb. 10-14, 2014, 3 pages, Prague, Czech Republic.

\* cited by examiner

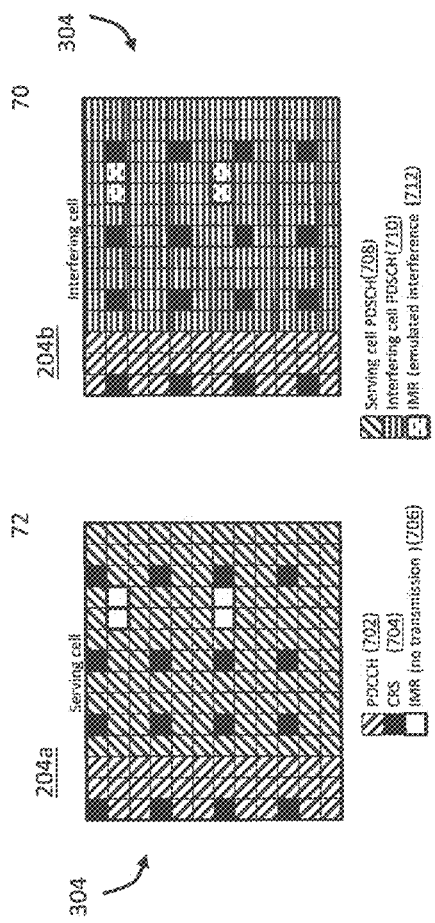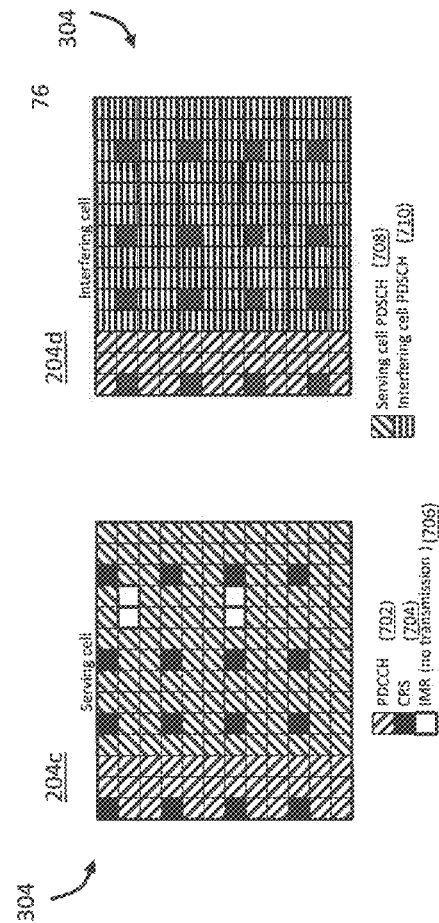
FIG. 7A
FIG. 7B

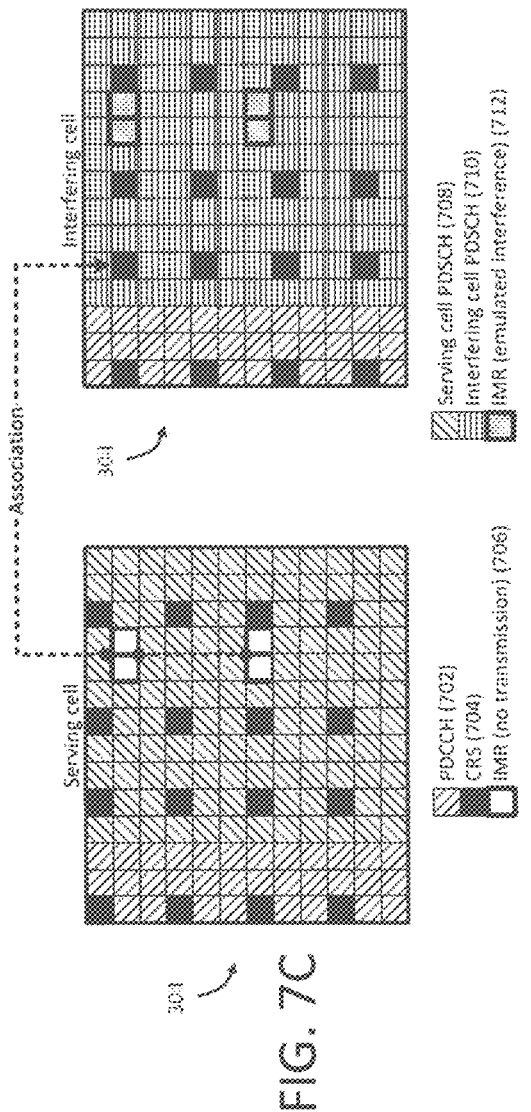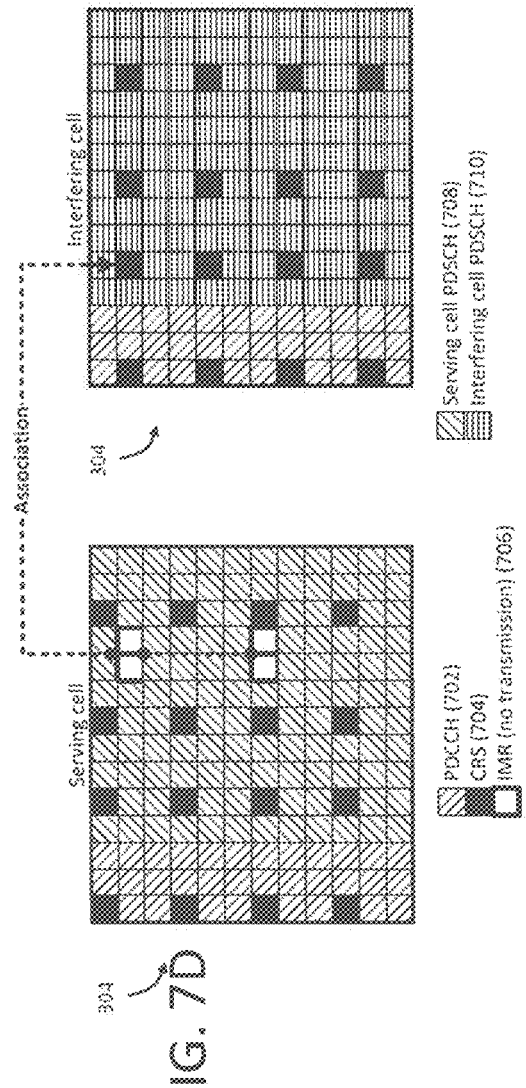
FIG. 7C
FIG. 7D

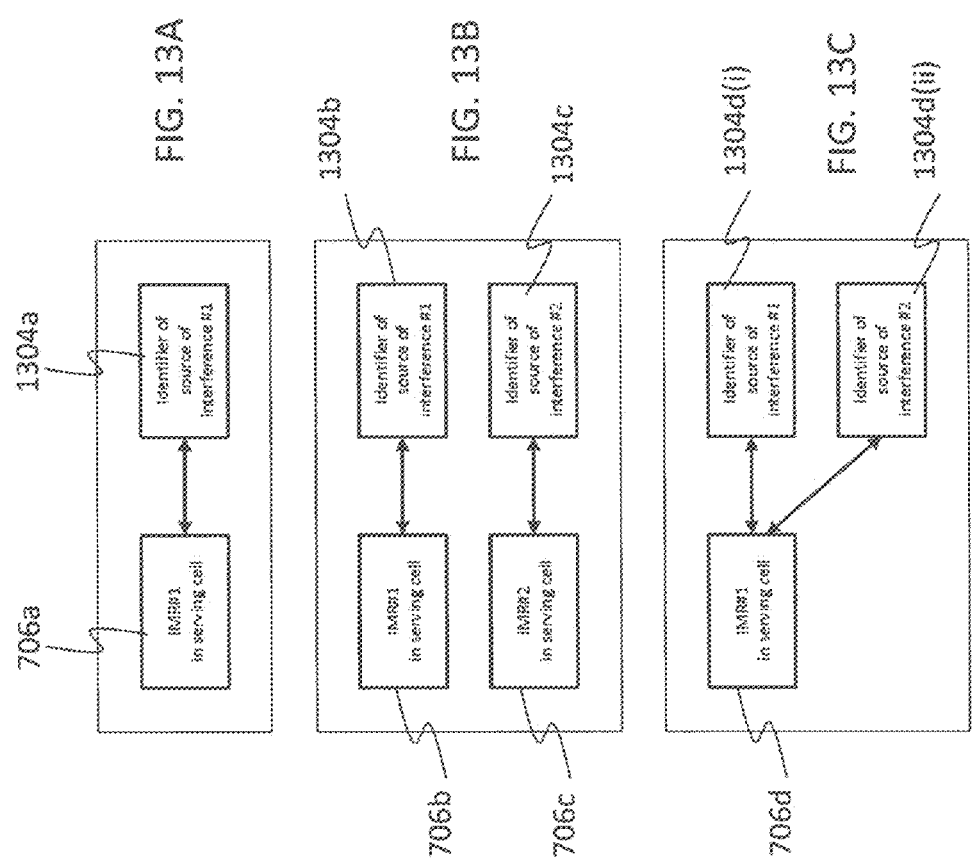

ESTIMATING CHANNEL INFORMATION

CROSS-REFERENCE TO RELATED APPLICATION

This application claims priority from GB Application No. 1405117.1, filed on Mar. 21, 2014, entitled "ESTIMATING CHANNEL INFORMATION". The above application is commonly assigned with this application and is incorporated herein by reference in its entirety.

TECHNICAL FIELD

This application is directed to a method of providing channel state information for a desired downlink channel of a wireless communication system.

BACKGROUND

In a wireless communication system, a receiver such as a mobile terminal communicates with a transmitter such as a base station over a wireless channel. The quality of the wireless channel may be reduced due to interference arising from various sources e.g. interfering transmissions from other transmitters, the interaction of transmitted signals with the physical environment in which they propagate, RF imperfection at transmitter or receiver side, etc.

In an 3GPP Long Term Evolution (LTE) system, the receiver may be a user equipment (UE) and the transmitter may be an evolved Node B (eNB) transmitting within a cell site (cell). Data are grouped together into transport blocks, and modulated and coded according to a modulation and coding scheme (MCS) selected from a number of possible MCSs.

Intra-cell interference at the UE may arise as a result of signals transmitted within that cell serving the UE, and inter-cell interference may arise due to signals transmitted in other cells in the vicinity of the UE.

Both the UE and the eNB may comprise multiple antennae for improved spatial diversity, transmit or receive beamforming, spatial multiplexing or more generally for multiple-input multiple-output (MIMO) transmission.

To date, most of the efforts in 3GPP LTE standardization have been spent on mitigating interference at the transmitter side, e.g. through spatial multi-antenna precoding, whereby data is transmitted from and received by multiple collocated antennae, coordinated beamforming (BF) to effect directional transmission/reception to direct interfering signals away from the UE, inter-cell interference coordination (eICIC, feICIC), and coordinated multi-point transmission (COMP). In CoMP, transmission from multiple antennae is coordinated (as in MIMO), although these multiple antennae are not necessarily collocated—e.g. transmission across multiple cells or transmission points may be coordinated to reduce interference and/to make desired data available to a UE from multiple cells contemporaneously (that is, in CoMP, a UE is not necessarily restricted to receiving desired data from only the serving cells or transmission points and may also be able to receive this data from neighboring cells or neighboring transmission points). CoMP defines transmission points (TPs) as a collection of one or more collocated antennae and, in general, transmissions across multiple TPs may be coordinated.

Transmitter-side interference mitigation techniques typically rely on the UE feeding back accurate information about the channel conditions it is currently experiencing e.g. in the form of channel state information (CSI). The transmitter is then able to adapt its various transmission procedures (e.g. by selecting an appropriate MCS and/or control or influence the behaviors of other transmitters based on the knowledge of the reported conditions. Channel state information may be determined and fed back with an aim of achieving a particular target transport block error rate (BLER) for example of 10%.

In LTE Release-11, linear interference suppression (IS) at the receiver side was investigated, and the observed performance gains motivated the introduction to TS 36.101 [3] of improved minimum performance requirements for UE demodulation under spatially colored interference. The Network Assisted Interference Cancellation and Suppression (NAICS) studies in 3GPP [2] and the recently approved work item [3] take another step towards further enhanced UE receivers targeting intra-/inter-cell interference cancellation (IC), most likely based on non-linear receiver processing such as e.g. maximum likelihood (ML) detection or symbol level interference cancellation (SLIC).

Enhanced user equipment (UE) receivers have also been studied in 3GPP standardization under the LTE Release-12 study item on NAICS [1]. The study was mainly motivated by the fact that dense wireless network deployments together with the growth of data traffic will lead to interference limited scenarios. Co-channel interference, either from inter-cell or co-scheduled intra-cell users, is expected to become the dominant factor limiting the overall downlink throughput performance of wireless networks.

SUMMARY

One aspect of this disclosure provides a method of providing channel state information for a desired downlink channel of a wireless communication system. This embodiment comprises, in a configuration phase, receiving on a signaling channel configuration information comprising an identifier of an interference source and an association which associates the identifier with at least one resource element not used for transmission on the desired downlink channel. In an estimation phase, channel state information is estimated for an expected transmission on the desired downlink channel accounting for an incoming interference transmission from the identified interference source as observed from the at least one resource element. In a reporting phase, the channel state information is reported.

In another embodiment, this disclosure provides a method of adaptive transmission on a downlink channel of a wireless communication system. In this embodiment, the method comprises, in a configuration phase, transmitting to a downlink receiver on a signaling channel configuration information comprising an identifier of an interference source and an association which associates the identifier with at least one resource element not used for transmission on the downlink channel. In a reporting phase, channel state information is received from one or a plurality of downlink receivers, and in a transmission phase, a downlink channel utilizing one or more transmission parameters selected according to the received channel state information is transmitted.

In another embodiment, this disclosure provides a receiver device for providing channel state information for a desired downlink channel of a wireless communication system. In this embodiment, the receiver device comprises a receiver configured, in a configuration phase, to receive on a signaling channel configuration information comprising an identifier of an interference source and an association which associates the identifier with at least one resource element not used for transmission on the desired downlink channel.

An estimation component is configured, in an estimation phase, to estimate channel state information for an expected transmission on the desired downlink channel accounting for an incoming interference transmission from the identified interference source as observed from the at least one resource element, and a reporting component is configured, in a reporting phase, to report the channel state information.

In yet another embodiment of this disclosure, there is provided a transmitter device for adaptive transmission on a downlink channel of a wireless communication system, wherein the transmitter device comprises a transmitter configured, in a configuration phase, to transmit to a downlink receiver on a signaling channel configuration, information comprising an identifier of an interference source and an association which associates the identifier with at least one resource element not used for transmission on the downlink channel. A receiver component is configured, in a reporting phase, to receive channel state information from one or a plurality of downlink receivers, wherein the transmitter is configured, in a transmission phase, to transmit on a downlink channel utilizing one or more transmission parameters selected according to the received channel state information.

BRIEF DESCRIPTION

Reference is now made to the following descriptions taken in conjunction with the accompanying drawings, in which.

Figure 8:
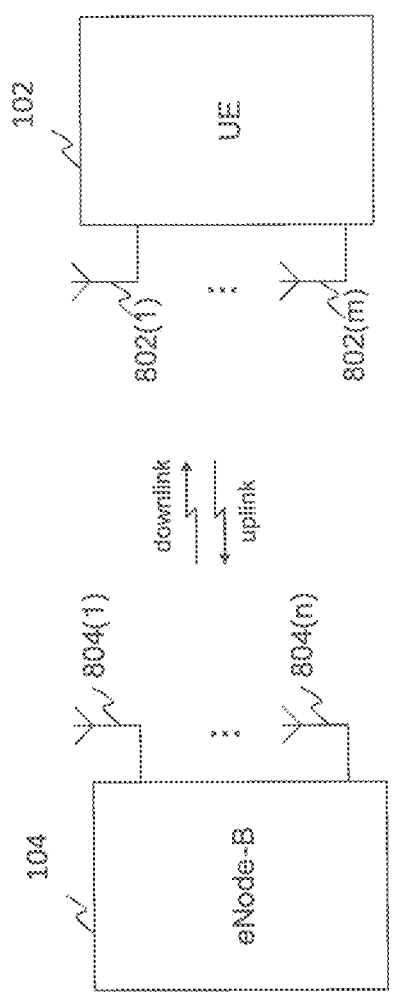

FIGS. 7C to 7F schematically illustrate exemplary associations that may be actively signalled to a UE;

FIG. 8 is a schematic block diagram of a MIMO system;

FIGS. 9 to 12 are graphs showing results of simulated user equipment performance; and FIGS. 13A to 13C are schematic illustrations of exemplary associations between serving cell interference measurement resources and identifiers of interference sources.

DETAILED DESCRIPTION

An aim of the disclosure is to provide channel state information that accurately reflects a receiver's ability to receive desired signals in an interfering environment when that receiver is performing receiver-side interference mitigation.

According to one embodiment, the disclosure is directed to a method of providing channel state information for a desired downlink channel of a wireless communication system. In a configuration phase, the method comprises receiving signaling channel configuration information comprising an identifier of an interference source and an association that associates the identifier with at least one resource element not used for transmission on the desired downlink channel. In an estimation phase, the method comprises estimating channel state information for an expected transmission on the desired downlink channel accounting for an incoming interference transmission from the identified interference source as observed from the at least one resource element. In a reporting phase, the method comprises reporting the channel state information.

The at least one resource element is deliberately not used for transmission of desired data on the downlink channel (and may not be used to transmit any data in that cell) in order to provide a window in which 'pure' interference can be observed by a receiver without having to separate that interference from any desired signal (as none is present). The disclosure recognizes that, by explicitly linking that window to a particular source of interference by actively signaling that association (as opposed to, say, relying on blind detection to deduce that association), the interference arising from that source can be more accurately accounted for when estimating the channel state information. The channel state information is thus a true reflection of the effective channel conditions of a receiver when performing receiver-side interference mitigation to mitigate interference from the identified source.

In certain embodiments, the method may comprising storing the received association and, in the estimation phase, accessing the stored association to identify the interference source.

In yet other embodiments, the method may comprise, in the estimation phase, determining a channel estimate for the identified interference source using the configuration information, the channel estimate being used to estimate the channel state information. The method of the first aspect may further comprise determining from the channel estimate one or more characteristics of an effective channel on which the interference transmission is transmitted. The effective channel may be precoded and the channel estimate may be for a non-precoded channel.

In another embodiment, an identifier may identify a characteristic of a reference signal that is transmitted by the interference source and the method comprises receiving the reference signal from the interference source, the channel estimate being determined based on the detected reference signal and the identified characteristic of the reference signal.

The estimation phase may further comprise determining one or more characteristics of interference from the identified interference source based on the observed interference transmission, and the channel state information may be estimated based on the determined characteristics of interference. The characteristics of interference may be determined based on the observed interference transmission and the determined channel estimate. The characteristics of interference may comprise at least one of: a presence or absence of interference from the identified interference source, transmission mode, transmission scheme, transmission rank, precoding matrix index, estimated precoding matrix, modulation order and pilot-to-data power ratio. The method may comprise receiving, on the or another signaling channel, at least one of the characteristics of interference that may be assumed over the resource element, and estimating at least another of the characteristics of interference based on that assumption.

The configuration information may comprise a plurality of interference source identifiers, for each identifier, and an association that associates that identifier with at least one respective resource element not used for transmission on the desired downlink channel. The method may comprise, for each identified interference source, estimating respective channel state information accounting for a respective incoming interference transmission observed from the at least one respective resource element associated with that interference source. The method may further comprise determining a respective channel estimate for that interference source using the identifier of that interference source, that channel estimate being used to estimate the respective channel state information for that interference source.

The configuration information may be transmitted on the signaling channel using semi-static signaling.

According to another embodiment, there is disclosed a method of adaptive transmission on a downlink channel of a wireless communication system, the method comprising: in a configuration phase, transmitting to a downlink receiver on a signaling channel, configuration information comprising an identifier of an interference source and an association that associates the identifier with at least one resource element not used for transmission on the downlink channel; in a reporting phase, receiving channel state information from one or a plurality of downlink receivers; and in a transmission phase, transmitting on a downlink channel utilizing one or more transmission parameters selected according to the received channel state information.

In other embodiments, the configuration information may comprise a plurality of interference source identifiers, and for each identifier, an association that associates that identifier with at least one respective resource element not used for transmission on the downlink channel. The transmission phase may further comprise transmitting emulated interference from the identified interference source on the associated at least one resource element.

According to another embodiment, there is disclosed at least one computer readable medium storing code which, when executed on a processor, is configured to implement the method of any preceding claim.

In yet another embodiment, there is disclosed a receiver device for providing channel state information for a desired downlink channel of a wireless communication system. The receiver device comprises: a receiver configured, in a configuration phase, to receive on a signaling channel, configuration information comprising an identifier of an interference source and an association that associates the identifier with at least one resource element not used for transmission on the desired downlink channel; an estimation component configured, in an estimation phase, to estimate channel state information for an expected transmission on the desired downlink channel accounting for an incoming interference transmission from the identified interference source as observed from the at least one resource element; and a reporting component configured, in a reporting phase, to report the channel state information.

According to a another embodiment, there is disclosed a transmitter device for adaptive transmission on a downlink channel of a wireless communication system, the transmitter device comprising: a transmitter configured, in a configuration phase, to transmit to a downlink receiver on a signaling channel configuration information comprising an identifier of an interference source and an association which associates the identifier with at least one resource element not used for transmission on the downlink channel; and a receiver component configured, in a reporting phase, to receive channel state information from one or a plurality of downlink receivers; wherein the transmitter is configured, in a transmission phase, to transmit on a downlink channel utilizing one or more transmission parameters selected according to the received channel state information.

Figure 1A:
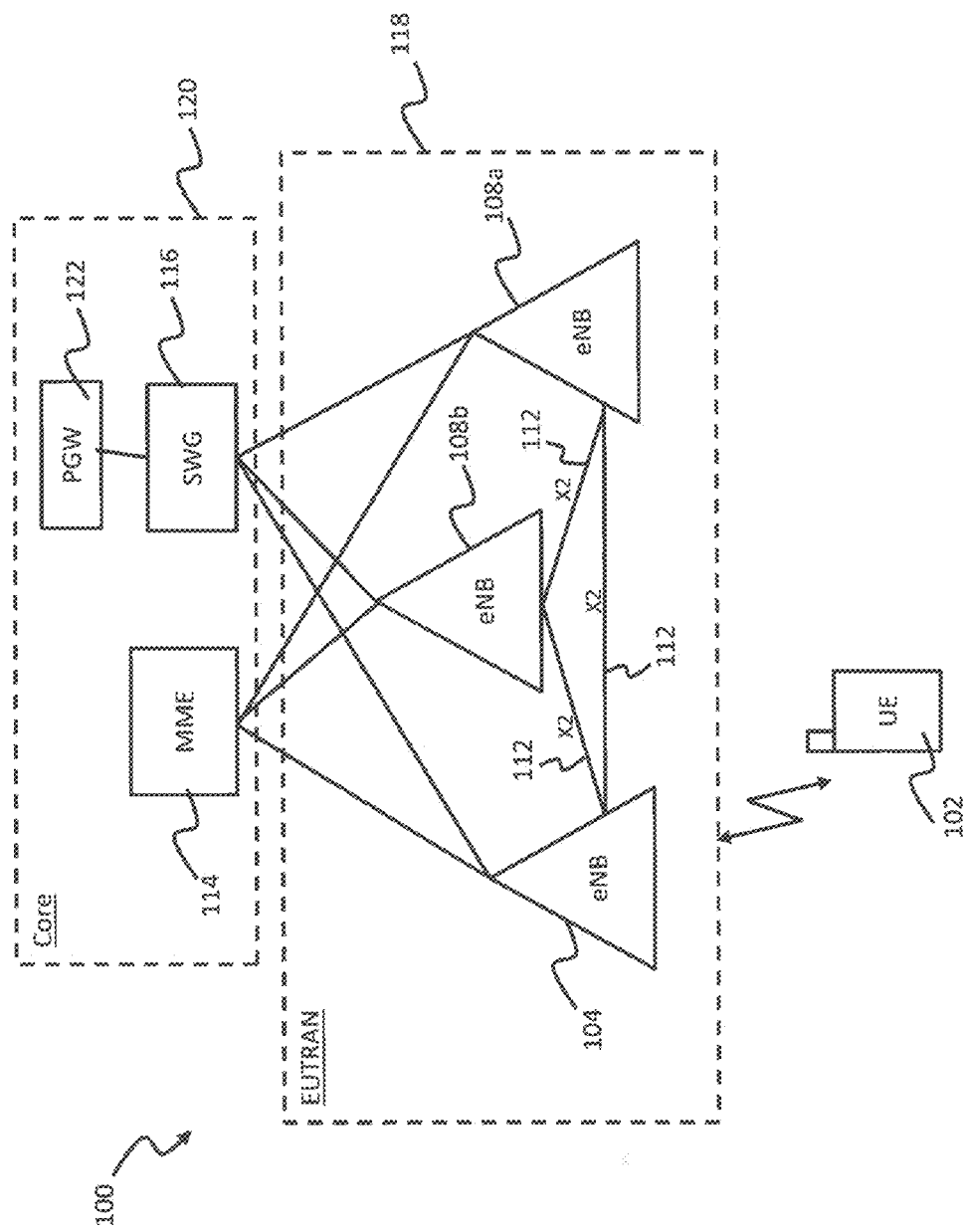
FIG. 1A is a schematic block diagram of a communication system.

FIG. 1A is a schematic illustration of elements of an LTE communication system 100. The system 100 comprises a receiver e.g. wireless communication device termed a "user equipment" (UE) 102. The UE may be, for instance, a mobile telephone such as a smartphone, other computer device such as a tablet or laptop computer or any other device having wireless communication capability. The communication system may comprise many such UEs (not shown). The system 100 also comprises a plurality of transmitters e.g. base stations in the form of Evolved Node Bs (eNodeB or eNB) 104,108a, 108b. An eNB can be viewed as an evolution of a UMTS Node B; however, in contrast to a UMTS Node B which is controlled by a Radio Network Controller (RNC), the eNBs 104, 108a, 108b have their own embedded controller functionality. As shown, neighboring eNBs are connected by respective "X2" interfaces 112 for the purpose of inter-eNB coordination. The X2 interface 112 provides low-latency peer-to-peer communication between neighboring eNBs and, among other things, facilitates handover and coordination of radio resources. Collectively, the interconnected eNBs constitute an EUTRAN (evolved UMTS Terrestrial Radio Access Network) 118 with which the UE 102 is in communication. The EUTRAN may comprise other network elements not shown in FIG. 1A.

Figure 1B:
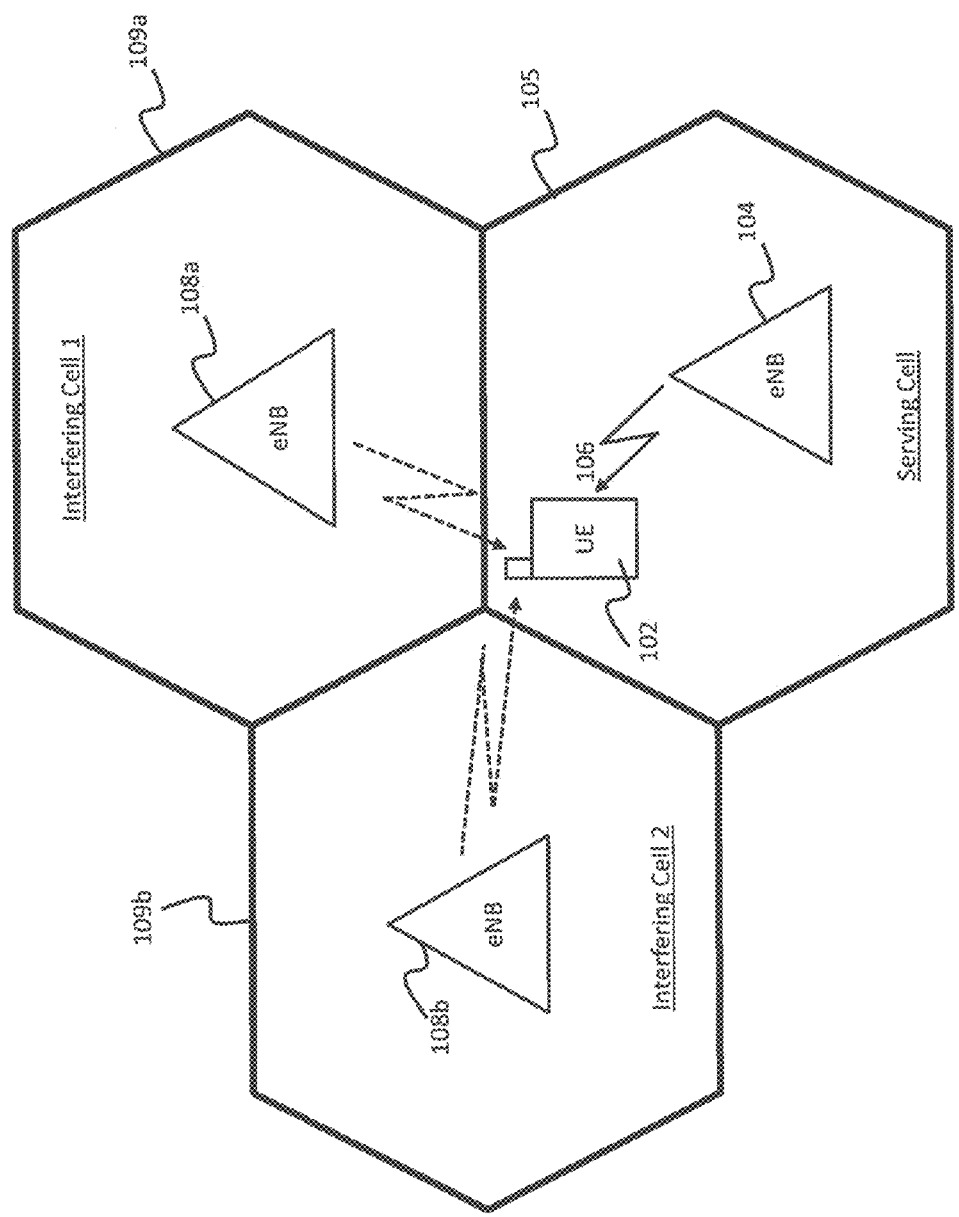
FIG. 1B is a schematic illustration of an interference scenario.

The system 100 further comprises a Mobile Management Entity (MME) 114, a Serving Gateway (SGW) 116 and a PDN gateway (PGW) 122 connected to the SGW 116 functioning as an intermediary between the SWG and an external data network (not shown) such as the Internet. The eNBs 104, 108a, 108b are each connected to the MME and to the SGW. The MME 114 functions as a control node for EUTRAN 118. Among other things, the MME 114 is responsible for initiating paging and authentication of the UE 102. Among other things, the SGW 116 routes and forwards user data packets between the eNBs and the PGW e.g., ultimately providing access to the external network to the UE 102. The MME 114 and SWG 116 constitute a core network 120 that may also comprise other network elements not shown in FIG. 1A. Each eNB 104, 108a and 108b is a transceiver which sends and receives wireless signals with one or a plurality of transmit and receive antennas and defines a respective cell site (cell) (105, 109a, 109b in FIG. 1B).

Figure 4A:
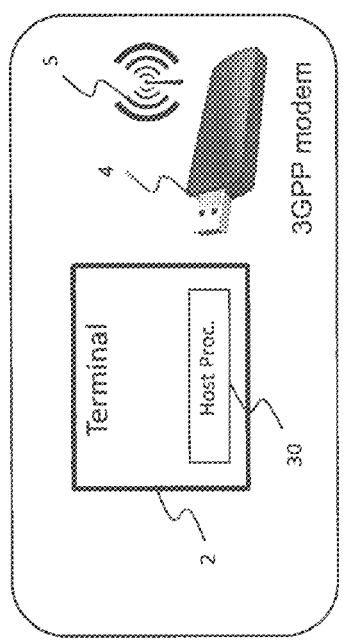
FIGS. 4A and 4B are schematic illustrations of exemplary user equipment configurations.

FIG. 4A is a schematic block diagram of an example configuration of user equipment 102. As shown in FIG. 4A the user equipment 102 comprises host terminal 2 and a modem 4. The host terminal 2 may be a user terminal, and may for example take the form of a desktop computer, laptop computer, tablet style computer, or mobile phone (which may be referred to as a "smart phone"). As shown in FIG. 1a, the modem 4 may for example take the form of a dongle for plugging into the host terminal 2 such that the modem 4 is connected to a host processor 30 (otherwise referred to as an application processor) of the host terminal 2. Alternatively the modem 4 may take the form of a mobile phone handset which, as well as being a conventional mobile telephone, can be connected to the host terminal 2 so as to act as an external cellular modem for the host terminal 2. As shown in FIG. 4A, the modem 4 may be external to the host terminal 2 in that it is a separate unit housed in a separate casing that is connected or connectable to the host processor 30 of the host terminal 2 by means of a wired or wireless connection (as well as being removable or being able to be disconnected from the host terminal 2).

Figure 4B:
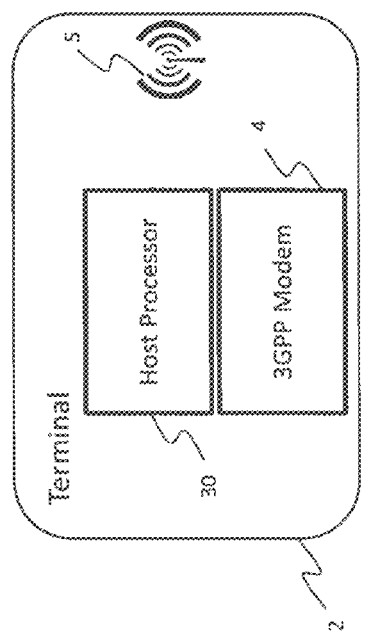

FIG. 4B is schematic block diagram of another example configuration of user equipment 102. As shown in FIG. 4B, the modem 4 may be internal to the host terminal 2, e.g. taking the form of a wireless module in the host terminal 2. For example, both the modem 4 and host processor 30 may be housed within the same casing of the host terminal 2. For example, the modem 4 may be internal to a mobile phone 2, and connected to the host processor 30 of the mobile phone 2 by way of a wired connection.

Figure 5:
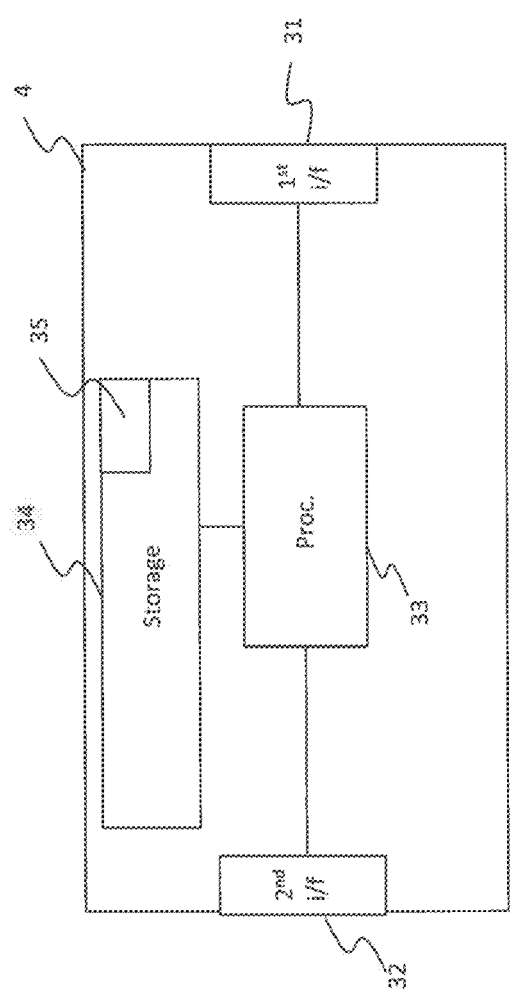
FIG. 5 is a schematic block diagram of a modem.

FIG. 5 is a schematic illustration of a modem 4. Referring to FIG. 5, the modem 4 comprises a processor 33 and, operatively coupled to the processor 33, a non-transitory computer-readable storage medium 34, such as a magnetic or electronic memory storing soft-modem code. The code on the storage medium 34 is arranged to be executed on the processor 33 and to perform operations of the modem 4 as discussed below. However, the possibility of some or all of the modem functionality being implemented in dedicated hardware is not excluded. The storage medium 34 is also operable to store data on which that code operates.

The modem 4 comprises a first interface 31. With reference to FIG. 4A, the first interface may comprise a wireless transceiver, typically in the form of a radio frequency (RF) transceiver and one or more antennae 5 for receiving and transmitting electromagnetic signals over-the-air. The first interface of the modem 4 connects via eNB 104 enabling the modem 4 to establish a channel between itself and the EUTRAN 118. With reference to FIG. 4B, the first interface may comprise a wired connection to an interface on the host terminal. The interface on the host terminal may comprise a wireless transceiver, typically in the form of a radio frequency (RF) transceiver and one or more antennae 5. The interface on the host terminal 2 connects via eNB 104 enabling the modem 4 to establish a channel between itself and the EUTRAN 118.

Figure 2:
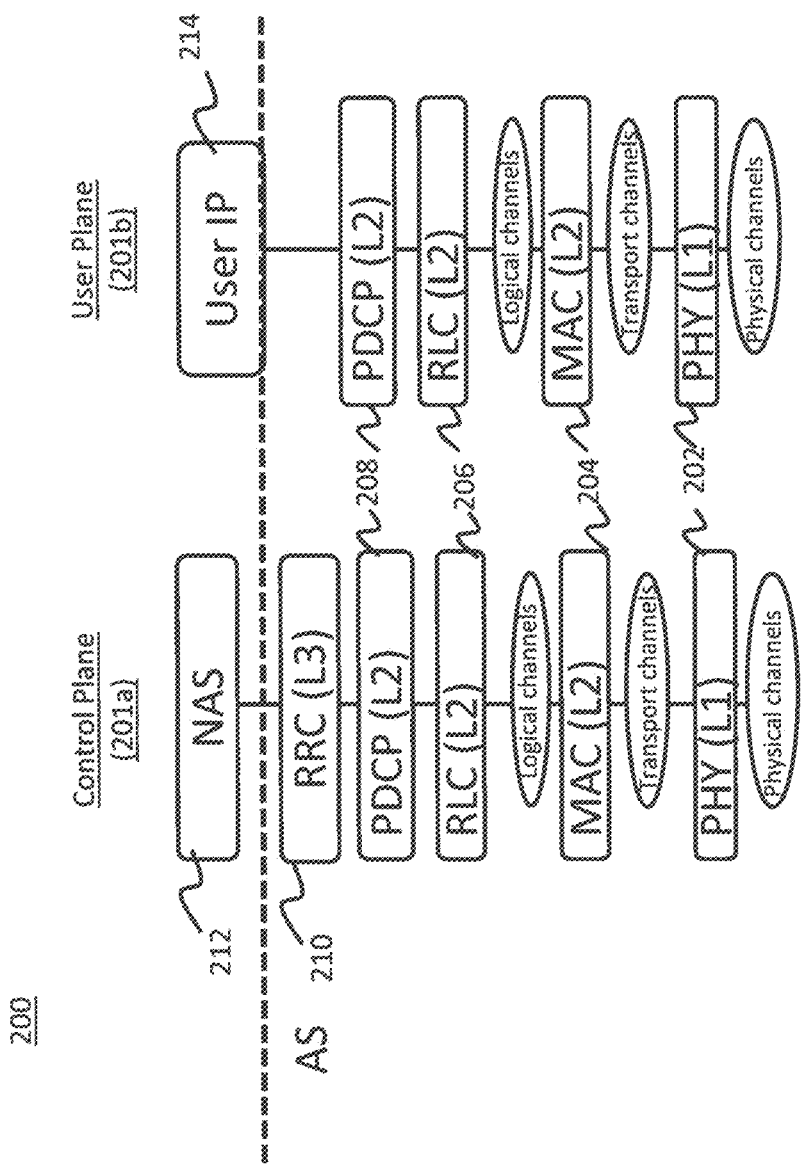
FIG. 2 is a schematic illustration of a layered communication protocol architecture.

Communication between the UE 102 and the core network 120 via the EUTRAN is effected in accordance with a multi-layered communication protocol architecture 200 illustrated as a block-diagram in FIG. 2.

The protocol architecture 200 is represented as comprising an access stratum (AS) which comprises a plurality of layers responsible for transporting data between the UE 102 and the core network via the radio access network. The protocol architecture 200 is separated into a control plane protocol stack 201a and user plane protocol stack 201b. The user plane protocols 201b are utilised for transmission of desired user data (such as call or Internet data) between the UE and the PGW via the eNB and the SGW. The control plane protocols 201 are utilised for transmission of control data between the MME and the UE to effect control operations. Each of the protocols 201a, 201b is represented as comprising a lower-level access stratum (AS) which comprises a plurality of layers responsible for transport of the user and control data as appropriate.

The user plane AS protocols comprise a physical (PHY) layer 202, medium access control (MAC) layer 204 above the PHY layer, radio link control (RLC) layer 208 above the MAC layer and a packet data convergence protocol (PDCP) layer 208 above the MAC layer. One or more logical and transport channels provide an interface between the RLC layer and the MAC layer, and between the MAC layer and the PHY layer respectively. The PHY provides access between one or more underlying physical channels—used for carrying data in the manner described below with reference to FIG. 3—and the higher layers. The user plane protocol stack 201b also comprises a higher-level user IP ("Internet Protocol") layer 214 above the AS which handles user IP data packet functions, and uses the lower AS levels to transfer IP packets between the UE and another IP endpoint via the radio access and core networks.

The control plane AS also comprises PHY, MAC, RLC and PDCP layers 202-208, and an additional radio resource control (RRC) layer 210 above the PDCP layer. Above the control plane AS is a higher-level non-access stratum (NAS) layer 212 which uses the AS to transfer control data between the UE and the MME of the core network.

The RRC performs the main control functions with the control plane AS. Functions of the RRC layer 210 include functions relating to system information (both AS and NAS related), paging and security functions, UE measurement reporting and control, and establishment (or release) of an RRC connection between the UE and EUTRAN to bring the UE out of (or into) an idle mode. Control interfaces (not shown) between the RRC layer 210 and the lower layer protocols 202-208 are used by the RRC layer 210 to configure characteristics of the lower layers, including parameters for the physical, transport and logical channels.

The RRC layer 210 provides services to higher layers for the transfer of control data. The service provided for control data is called a Signaling Radio Bearer (SRB). A SRB is associated with a signaling radio bearer queue and a logical channel. The RLC layer 205 may comprise multiple SRB's such that each SRB is associated with a signaling radio bearer queue and a logical channel. A SRB specifies the characteristics of a logical, transport and physical channel being used to transfer data between the UE 102 and core network 108, and different SRBs may be specified depending on the type of messages that are transferred. When data is transmitted to (resp. from) the UE on a physical channel, it passes up (resp. down) though the lower layers in turn using the logical and transport channels.

As discussed below, the RRC layer signals an identifier of an interference source and an associated resource element not used for transmission in the serving cell to the UE.

For example, control data may be received by the UE on a physical downlink control channel (PDCCH) or enhanced physical downlink control channel (EPDCCH) and passed up though the control plane stack 210a using appropriate transport and logical channels. User data may be received on a physical downlink shared channel (PDSCH) and passed up though the layers of the user plane stack 201b again using appropriate transport and logical channels.

The UE implements the AS layers and both the control plane NAS layer and user plane user IP layer. The eNB implements AS layers, but not user IP or NAs layers. The MME and the PGW implement NAS and user IP layers respectively. Lower-level communication between the eNB and the core network is effected in accordance with a different set of lower-level protocols (not shown).

Data transmitted from the eNB to the UE (downlink data) is transmitted using Orthogonal Frequency Division Multiplexing (OFDM), wherein data is transmitted over multiple narrow band frequency carriers (each of width 15 kHz).

Figure 3:
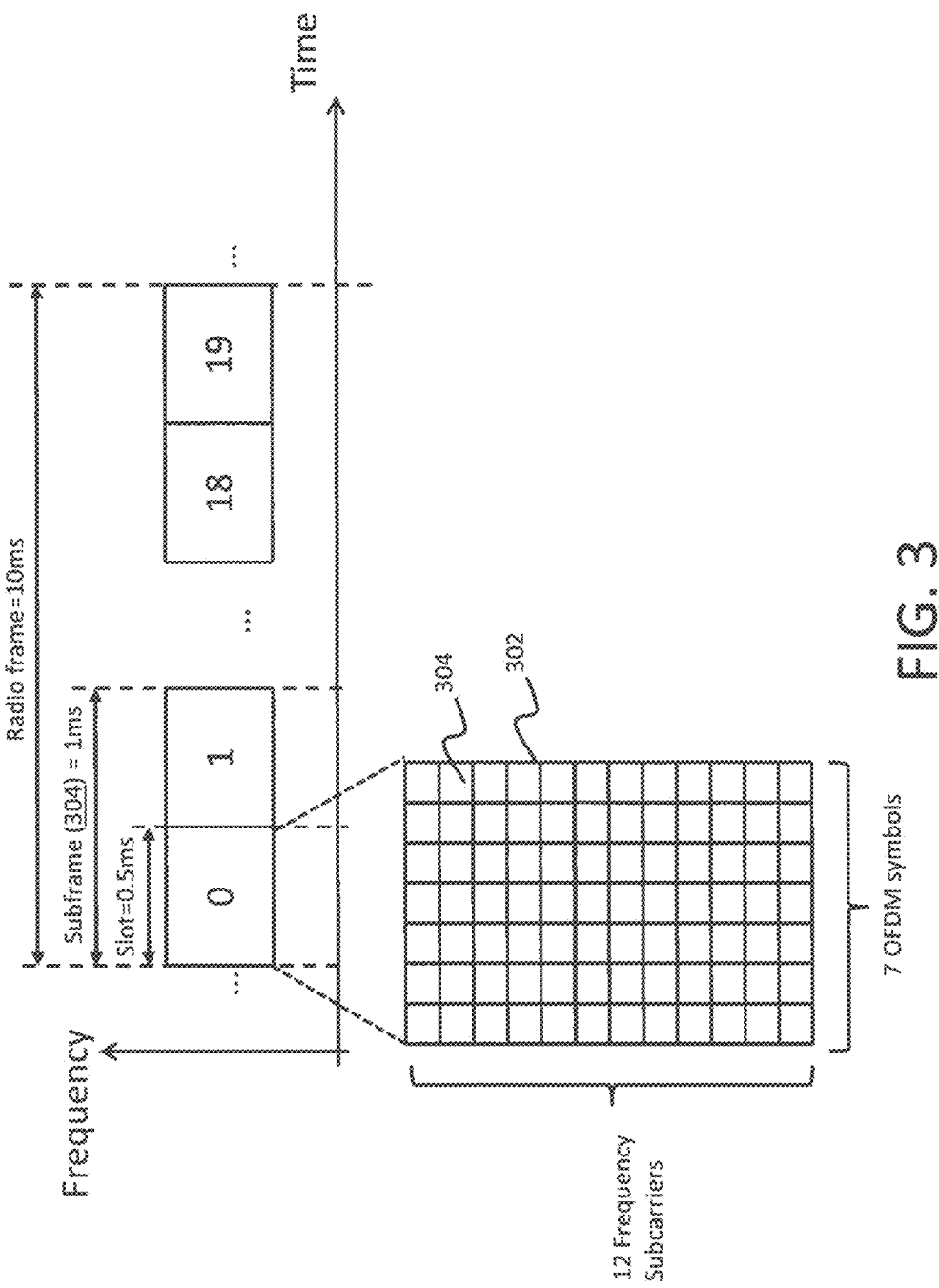
FIG. 3 is a schematic illustration of physical resources within a communication system.

Physical time-frequency resources used for transmission of downlink data are apportioned as illustrated in FIG. 3. A radio frame is defined to be 10 ms in length, and each radio frame is divided into twenty slots (0.5 ms in length), with two slots constituting a subframe (1 ms in length). Each slot spans seven OFDM symbols, and time-frequency resources are assigned to UEs e.g. on a per-resource block basis a resource block being the smallest resource unit that can be assigned to a UE) although depending on the resource allocation type (0, 1, 2) the UE may be allocated resources on a per PRB basis, RGB (resource allocation group) basis or contiguous virtual resource blocks (VRB). An exemplary (physical) resource block (PRB) 302 is shown in FIG. 3 and comprises seven OFDM symbols and spans 12 frequency subcarriers. The resource block 302 is divided into multiple resource elements 304, each resource element being one OFMD symbol in length and spanning a single sub carrier. A resource element is the smallest unit of time-frequency resource in the context of LTE. Each downlink physical channel corresponds to a set of one or more resource elements used to transmit data on that channel to the UE.

In other Radio Access Technologies (RATs), resources may be divided into resource elements differently.

Cells—or more generally transmission points—in an LTE network may dynamically schedule user data in downlink over time and frequency resource elements.

Returning to FIG. 1B, the eNB 104 is shown functioning as a serving eNB to the UE 102 in that desired data is transmitted between the UE 102 and the eNB 104, the cell 105 thus constituting a serving cell from the perspective of the UE 102. In particular, desired signals are transmitted from the serving eNB 104 to the UE 102 via physical downlink channels 106, which include a Physical Downlink Shared Channel (PDSCH) and a Physical Downlink Control Channel (PDCCH) or Enhanced Physical Downlink Control Channel (EPDCCH). The PDSCH is the primary downlink data-bearing channel in LTE. The PDCCH or EPDCCH is used to convey control information to the UE 102, such as information about which wireless resources are assigned to the UE 102.

Alternatively, as mentioned, the disclosure applies to the general case of a (serving) transmission point and interfering transmission points.

The eNBs 108a, 108b are geographic neighbors of the serving cell 104. Due to this proximity, signals transmitted by these eNBs 108a, 108b (e.g. intended for other UEs) can interfere with the desired signals transmitted by the serving eNB 104, causing unwanted degradation in signal quality of the desired signals received at the UE 102. Thus, from the perspective of the UE 102, the eNBs 108a, 108b function as interfering eNBs and their cells 109 constituting interfering cells creating inter-cell interference. The UE 102 is shown located near the boundary between the serving cell 105 and the interfering cells 109 where the unwanted interference effects are typically most acute in a homogeneous network (e.g. of only macro nodes), although interference effects may none the less be present away from cell boundaries. This exemplary situation is one example of an interference limited scenario, in which channel quality experienced by the UE 102 is reduced due to the presence of the inter-cell interference (causing reduced data transmission rate, higher error rate etc.). Other exemplary situations include heterogeneous network deployments e.g. with additional pico node interferers within the macro cell sites—in this case, interference may arise anywhere within the serving cell.

In addition to the inter-cell interference from neighbouring cells, the UE 102 may also experience intra-cell interference e.g. due to transmission within the serving cell but to/from other UEs and/or due to the effects of the physical environment on propagating signals. Noise, such as thermal noise, may also reduce the channel quality observed by the UE 102.

To improve spatial diversity or alternately benefits from transmit/receive beamforming or spatial multiplexing, the UE 102 and the eNB 104 are equipped with multiple antennae, with transmission/receipt of data being coordinated across those multiple antennae. "MIMO" (multiple-input, multiple-output) refers to the use of multiple transmit antennas and multiple receive antennas for the transmission of a signal in order to improve performance in a wireless communication system. A highly schematized block diagram of a MIMO system is shown in FIG. 8. The system comprises the transmitter (eNB) 104 having multiple antennas 804(1) . . . 804(n) and the receiver (UE) 102 having multiple antennas 802(1) . . . 804(m). The transmitter 104 transmits a signal on some or all of its antennas 804, and the receiver 102 receives the signal on some or all of its antennas 802.

Implemented at the eNB 104 are multiple antenna ports. An antenna port is not a physical antenna, but rather is a logical entity mapped to one or more physical antennae 804. A signal supplied to a logical antenna port for transmission can thus be transmitted via multiple physical antennas to which that antenna port is mapped.

The UE 102 feeds back channel state information to the eNB 104 so that transmission from the eNB 104 to the UE can be adapted in dependence on channel conditions experienced by the UE (influenced by inter and intra-cell interference, noise etc.) and also allows the eNB to make scheduling decisions by selecting which UEs to serve over given resources as to optimize the overall cell throughput, for instance using frequency domain packet scheduling (FDPS). Channel state information feedback includes the UE 102 feeding back to the network (over an uplink) channel state information (CSI) comprising of Channel Quality Indicator(s) (CQI), rank indicator(s) (RI) and precoding matrix indicator(s) (PMI), the latter only in the case of closed-loop precoding transmission modes (TM4, TM6, TM9, TM10)—these are discussed in detail below. In the context of CoMP, UE is configured with one or more CSI feedback processes, and the UE feeds back CSI for each CSI feedback processes. The CSI requested by the eNB for a given CSI feedback process may correspond to a given emulated transmission hypothesis provided to the network but unknown to the UE. One CSI feedback process consists of one CSI-RS resource—intended for downlink channel estimation purposes and one CSI interference measurement resource (CSI-IM)—intended for interference measurements for CSI feedback.

This feedback allows in turn the base station (eNB) to make downlink scheduling decisions. Accurate CSI feedback typically translates to good user throughput performance since the predicted modulation and coding scheme (MCS) and transmission rank allow demodulation with a given target block error rate (BLER), typically around 10%, and hence the eNB can match the used MCS and rank with the instantaneous channel conditions.

For instance, in a MIMO system, to achieve good closed-loop performance, the transmitter 104 may perform MIMO "pre-coding" whereby it uses channel information to determine the relative amplitude and phase with which to transmit the signal on each antenna. In general, this information has to be fed back from the receiver 102. To reduce the amount of feedback overhead, a precoding matrix approach may be used. The basic idea behind this approach is to quantize the MIMO channel using a codebook consisting of a set of pre-defined matrices. For each channel realization, the receiver 102 finds the best precoding matrix (according to some performance criteria) from the codebook shared between the receiver and the transmitter, and then feeds back only the index of this matrix to the transmitter. This index may be referred to as a precoding matrix indicator (PMI), mentioned above. The PMI feedback may be requested by the eNB on a per subband (multiple PRBs) or wideband basis (the whole system bandwidth).

Another piece of information that the receiver 102 feeds back to the transmitter 104 is the rank indicator (RI), mentioned above. This provides (or at least relates to—see below) the rank of the channel matrix, which is defined as the number of linearly independent columns of the channel matrix. For example, a NT=4×NR=4 channel matrix can have rank equal to 4, 3, 2 or 1 (rank min (NT,NR)). The rank of the channel also determines the size of the precoding matrix to be used by the transmitter, i.e., the number of columns of the precoding matrix. Depending on the channel rank, the transmitter 104 will consider a specific subset of the full precoding codebook. Therefore, the transmitter 104 needs to know what rank the received PMI is referring to.

However, the rank of the channel itself may not be reported. The UE reports a rank as an RI which provides the best throughput for downlink transmission, and this depends mainly on both the channel rank and signal to noise and interference conditions (so that the reported RI may not be the same as the actual channel rank).

Further, in addition to the RI and PMI, the receiver 102 feeds back the channel quality indicator (CQI) to the transmitter 104, indicative of some metric relating to the received quality on the downlink channel. For instance, in TS36.213, the reported CQI is defined to target a maximum block error rate of 10%. The transmitter 104 can then consider this when adjusting its transmission to the receiver 102, typically selecting the appropriate modulation scheme and code rate to match the receiver channel quality information. The feedback of the CQI information for a particular downlink channel may be either frequency selective or non-frequency selective. In the non-frequency selective case, the receiver 102 simply feeds back a single wideband CQI for the whole channel (that if, a single report for all frequency sub-bands spanned by the downlink channel). In the frequency selective case, the receiver 102 also feeds back a CQI for each of a plurality of groups of sub-bands spanned by the downlink channel.

CSI feedback is typically derived by the UE from reference symbols (RS)—the intended structure of which is known to the UE 102—such as e.g. common reference symbols (CRS), channel state information reference symbols (CSI-RS), possibly with the additional use of an interference measurement resources (IMR) also referred to as CSI interference measurement resource (CSI-IM). The wording in the LTE specifications is CSI interference measurement resource (CSI-IM). IMR was used during a CoMP study item phase—see reference [9], which summarizes the outcome of studies done in 3GPP for CoMP.

Here, an IMR of a given cell refers to one or more resource elements that are not used by that cell for transmission of user or control data to UEs on that cell—that is, resource elements for which no UEs in that cell are scheduled to receive data. The cell may be muted for an IMR—that is, transmit no signals at all on the one or more resource elements—in which case the IMR is referred to as a zero-power IMR. Alternatively, the cell may transmit signals on the one or more resource elements that are not intended for any UEs in that cell (as no UEs in that cell are scheduled to receive transmissions on that resource element), but which are intended to act as controlled (emulated) interference signals that permeate other cells and which can be used by UEs in those other cells to determine information about the given cell (see below). In this case, the IM is a non-zero power IMR but is configured as a zero power IMR for the UEs in that cell.

For instance, in the Release 11 of the LTE standard (cf. clause 7.2.6 of TS36.213), for a serving cell and UE configured in transmission mode 10, the UE can be configured with one or more CSI-IM resource configuration(s). The following parameters are configured via higher layer signaling for each CSI-IM resource configuration: zero-power CSI RS configuration and zero-power CSI RS subframe configuration.

Reference symbols allow the UE to determine the best PMI(s), transmission rank as well as the modulation and coding scheme further to be reported over the uplink embedded to the CSI together with the CQI. Deriving the CQI involves factoring channel and interference estimates derived from the RS or alternatively from the IMR together with the PMI and RI, and predicting the highest CQI index that results in a demodulation BLER less than the target.

In addition to providing CSI feedback, the UE 102 also functions as an "enhanced receiver" (e.g. NAICS) configured to actively perform receiver-side interference mitigation. The UE 102 may, for instance, perform receiver-side interference mitigation based on non-linear receiver processing such as e.g. maximum likelihood (ML) detection or symbol level interference cancellation (SLIC).

To perform receiver-side interference mitigation, a UE typically needs information about the interference characteristics e.g. one or more parameters of a transmission (or transmissions) by a source (or sources) of interference. That is, "enhanced receivers" require the knowledge of interference characteristics in order to prove beneficial (i.e. provide user throughput gains). Among the studied receivers in the previously-mentioned NAICS studies, symbol level IC receivers were found to be particularly promising for enhanced performance when facing inter-cell interference. Such receivers take advantage of the fact that the interfering symbols come from a finite set of constellation points. The main interference characteristics/parameters required by these receivers in order to perform (e.g.) interference cancellation were identified during the study [2] as:

Presence/absence of interference over given time/frequency resources;
Number and identity of interfering cells;
Antenna ports in use (CRS or DM-RS) and their parameters (e.g. AP number and virtual cell ID for DM-RS);
Transmission mode (CRS-based: TM1-6, DM-RS based TM7-10);
Transmission scheme (e.g. transmit diversity precoding, closed-loop precoding, large-delay CDD precoding);
Transmission rank;
Precoding matrix index (PMI) or precoding matrix, for transmission modes based on closed-loop precoding
Modulation order (e.g. QPSK, 16QAM, 64QAM, 256QAM);
Pilot-to-data power ratio.

It is noted that in relation to transmission modes, LTE Release 12 comprise a total of ten transmission modes for PDSCH as described in reference [11]. Each transmission mode makes use of one or more transmission schemes. The transmission schemes themselves are enumerated in clauses 7.1.1 to 7.1.5B of reference [11] as: single-antenna port scheme, transmit diversity scheme, large delay cyclic delay diversity (CDD) scheme, closed-loop spatial multiplexing scheme, multi-user MIMO scheme, dual layer scheme, up to 8 layer transmission scheme. The precoding associated to these transmission schemes is described in clauses 6.3.4 of reference [12]. Since these transmission modes share in common the same or a subset of the same transmission schemes, transmission mode detection at the UE side amounts to detect the underlying transmission scheme(s). For instance, TM3 makes use of transmit diversity precoding for rank 1 transmission and large delay CDD precoding for rank 2 transmission, thus detecting the presence of TM3 transmission amount to detecting the presence of either one of transmit diversity precoding or large delay CDD precoding. Also, some transmission modes use transmit diversity precoding for fallback operation (e.g. to maintain the communication alive in case radio conditions would happen to suddenly deteriorate): for instance TM4 uses closed-loop precoding (for rank 1-4 transmission) and transmit diversity precoding for fallback operation. TM2 implements only transmit diversity precoding. Since UE interference cancellation is targeted, it is the interference transmit precoding scheme detection that really matters in the case of CRS-based transmission modes, in order to allow the UE to reconstruct accurate estimates of the interfering signal in the interference cancellation/mitigation process. The transmission scheme derives, together with the channel estimate obtained from CRS, the equivalent transmission channel.

On the other hand, for DM-RS based transmission modes, transmit precoding is already embedded to the DM-RS. Thus, by estimating the channel from the DM-RS, the UE directly obtains an estimate of the equivalent transmission channel. There is no further need to identify the transmission scheme from the received interfering PDSCH transmission. For demodulation, it suffices for the UE to detect the presence of a DM-RS mode.

One or more of these parameters may be actively signaled to the UE by the serving cell. Alternatively or additionally, the UE may rely on "blind detection" whereby the UE performs signal processing on signals received from the source(s) of interference infer some or all those parameters instead.

For instance, some parameters may be actively signaled to the UE and the UE may estimate the remaining parameters blindly. The signaled parameters may be used to simplify the blind detection process (discussed below).

For blind detection, these parameters are estimated blindly at a receiver using blind detection processes that are known in the art. For instance blind modulation detection may perform as taught by the reference [10], Intel Corporation, and references therein. In another example, blind PMI/RI detection may be performed using second order statistics such as the received interference covariance matrix estimate, as taught in the reference [7]. These approaches may be extended e.g. taken sequentially or combined in order to produce joint PMI/RI/modulation estimates.

Since the cells in an LTE network may dynamically schedule user data in downlink over time and frequency, from the 'victim' UE 102 perspective, for the most part, interference characteristics may vary in the worst case with a granularity down to a single physical resource block (PRB). Those dynamically varying parameters were identified during the study item phase [9] as "desirable for blind detection" at the UE side.

Some interference parameters (e.g. number of antenna ports) are not dynamic in nature and are semi-statically configured over longer periods of time (e.g. in the order of tens of milliseconds, hundreds of milliseconds or even larger time periods). Those may be then conveyed to the victim UE via higher layer signaling (e.g. RRC). Such assistance signaling may use higher layer signaling regardless of whether the associated transmission parameter is higher-layer configured or dynamic.

Investigations to date have focused primarily on the demodulation as well as cell throughput performance of NAICS receivers performing receiver-side interference mitigation.

However, the disclosure appreciates that, when both receiver-side and transmitter-side interference mitigation is used, undesired effects can arise due to the influence these different processes have upon one another.

For example, if the UE is able to perform receiver-side interference mitigation, the effective channel conditions experienced by that receiver are better than would be the case in the absence of receiver-side interference mitigation. However, if the UE does not reflect these effective channel conditions in the fed-back channel state information (e.g. because it computes the channel state information before performing and/or without taking into account receiver-side interference mitigation), then the reported channel state information will be an overly-pessimistic reflection of the UE's ability to successfully receive desired signals from the transmitter. Conversely, when the UE does reflect its receiver-side interference mitigation capability in the fed back information, it may effectively over-estimate its ability to mitigate interference e.g. if the fed-back information does not adequately take into account possible variations in the dynamic interference environment or residual interference due to imperfect interference mitigation.

References [5] and [6] consider CSI feedback for NAICS receivers through link and system level evaluations respectively, and provide some evidence that CSI can be misleading in the context of NAICS receivers. For instance, the disclosure appreciates from the system level simulations in reference [6] that CSI derived before IC would be too conservative as the IC operation at UE side is not reflected in the reported CSI in this case, and thus would not reflect the target 10% BLER. On the other hand, if the CSI is derived after IC, it could turn out to be too optimistic and would then under-estimate the true demodulation BLER. In the first case, one may not achieve a throughput gain due to pessimistic link adaptation not taking into account the full demodulation gains of NAICS receivers. Similarly, the second case likely leads to throughput degradation due to increased BLER. Likewise, link level simulations in reference [5] report a large drift in the achieved BLERs when existing CSI feedback mechanisms are used.

Further, in the case of NAICS receivers employing receiver-side interference mitigation, deriving CSI feedback requires properly factoring information on the interference parameters such as e.g. transmission mode, transmission scheme, PMI, RI and modulation order. However, the UE faces the following issues:

CRS used for CSI feedback may collide between the serving and aggressor cells. The colliding aggressor CRS does not have the same spatial channel signature as the aggressor PDSCH because the latter is spatially precoded whereas the CRS are not precoded. In addition, the UE cannot determine interfering PDSCH characteristics based on CRS positions (such as the applied modulation order), even with the help of CRS interference cancellation.

In order to detect the interfering PDSCH characteristics, it is beneficial to know also the characteristics of the serving cell PDSCH, as the serving cell PDSCH appears as an interference term in the detection of the interfering PDSCH characteristics. However, PDSCH region in the serving cell may contain unknown scheduled data for other UEs within the cell, in addition to the own data if scheduled in the same subframe. It is not seen as feasible to blindly detect unknown serving cell dynamic transmission parameters in addition to interferer parameters in order to compute CSI feedback.

CSI measured at a given TTI may not reflect real transmission/interference conditions at a later time instance. This is a more general issue of CSI feedback, and not necessarily specific to NAICS.

Consequently, the disclosure recognizes that existing CSI feedback mechanisms are not sufficient in order to extract the full potential and demodulation gains of enhanced UE receivers.

Among other things, the disclosure provides a way to tackle the above issues and alleviate the deficiencies of existing CSI feedback mechanisms. That is, the present disclosure provides means for more accurate CSI feedback for enhanced UE receivers performing receiver-side inter-cell interference cancellation, by leveraging interference measurement resources (IMR) and CSI processes introduced for CoMP in LTE Release-11. Two schemes were mainly targeted at for Release-11 CoMP: dynamic transmission point selection (DPS), possibly with dynamic transmission point blanking (DPB) where blanking refers to muted transmission, and non-coherent joint transmission. In joint transmission, two, or more, transmission points, transmit on the same frequency in the same subframe Dynamic point selection refers to a scheme where data is available for transmission at two or more transmission points but only scheduled from one transmission point in each subframe. Additionally, the transmission point not scheduling data to a given UE in a given subframe may additionally mute its transmission and thereby reduce interference it generates: this mode of operation is referred to as DPB.

As previously mentioned, in the context of CoMP, UE is configured with one or more CSI feedback processes, and the UE feeds back CSI for each CSI feedback process. The CSI requested by the eNB for a given CSI feedback process may correspond to a given emulated transmission hypothesis provided to the network but unknown to the UE. One CSI feedback process consists of one CSI-RS resource, intended for downlink channel estimation purposes, and one CSI interference measurement resource (CSI-IM), intended for interference measurements for CSI feedback.

One type of IMR or equivalently referred to as CSI-IM is a zero-power CSI-RS resource introduced for interference measurements in support of CSI feedback. That is, the IMR is one or more resource elements that are not used for transmission to the UE 102 by the serving eNB 104 and, indeed, which are not used for any downlink transmission within the serving cell at all, such that no no data is scheduled to any UE in the serving cell on those resource elements. Additionally, eNodeB rate-matches any downlink data it schedule to any UE in that cell around the zero-power CSI-RS resource, and all the UEs in that cell do have the same understanding for rate de-matching their respective received data.

Zero-power IMRs 706 are illustrated on the left-hand side of FIGS. 7A and 7B, where exemplary usage of resource elements 304 by the serving cell 105 are illustrated. As can be seen, in this example four resource elements in two different frequency carriers are used as IMRs (that is, transmission in the serving cell is muted for these resource elements). Each zero-power IMR of the serving cell provides a window in which 'pure' interference (e.g. from interfering cells 109a, 109b) can be observed by UEs in that cell without those UEs having to separate that interference from any transmissions in the serving cell (as none are present). FIGS. 7A and 7B also illustrate resource elements used for non-zero-power IMR transmission 712 (as it is sometimes referred to herein), resource elements for common reference symbols (CRS) 704, resource elements used for PDCCH transmissions 702, and resource elements used for PDSCH transmissions in the serving cell (708) and in the interfering cell (710). The transmission scenarios to which FIGS. 7A and 7B relate are discussed below.

In CoMP, the UE may be configured to transmission mode TM10, with one or more CSI feedback processes, where each process comprises a CSI-RS resource (for channel estimation) and a CSI-IM (IMR) (for interference measurements). In TM10, the UE shall derive the interference measurement for CSI feedback from the CSI-IM (IMR).

Figure 6:
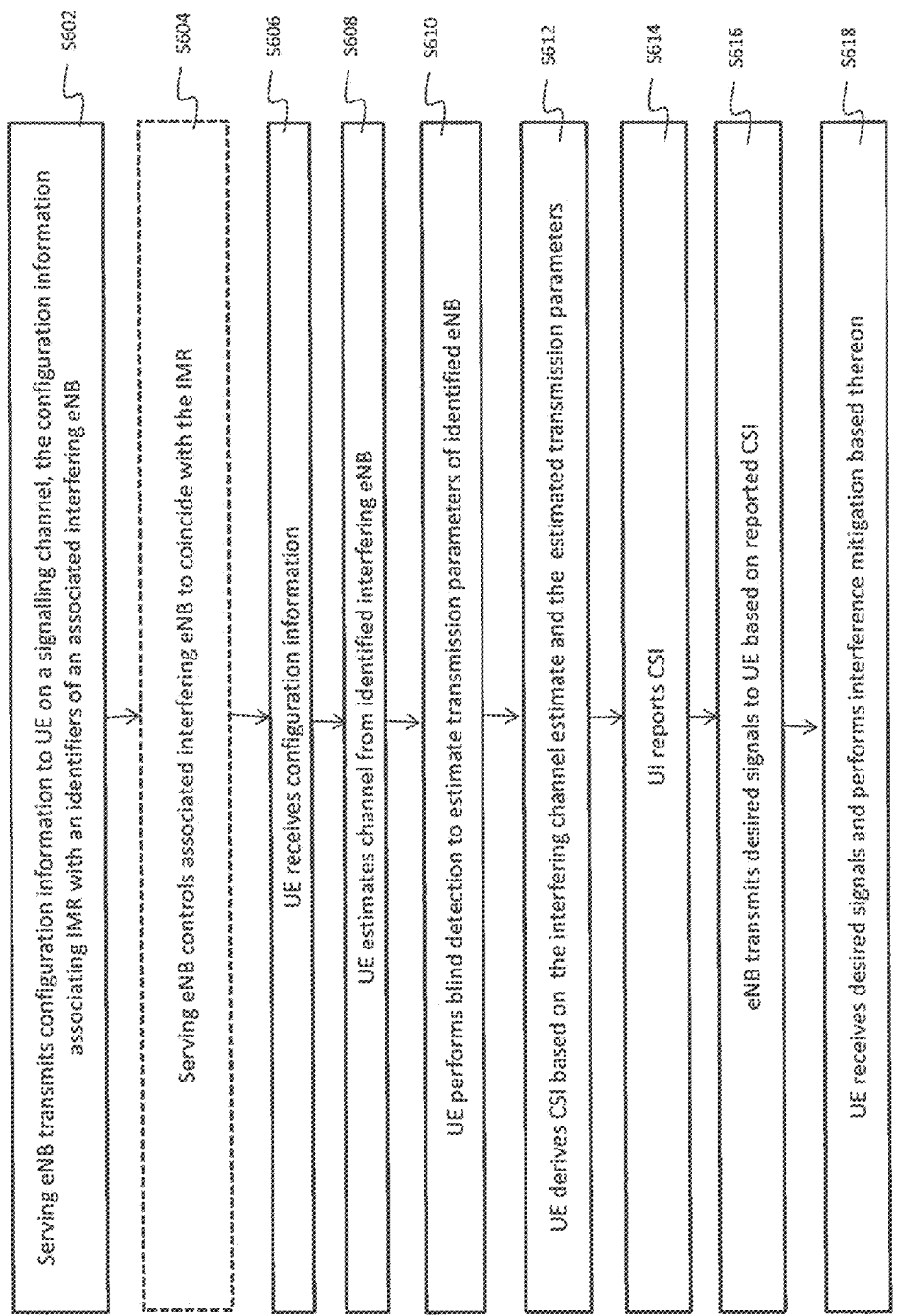
FIG. 6 is a flowchart for a method of providing channel state information.

A method of providing channel state information for a desired downlink channel of a wireless communication system—in which the channel state information is estimated using received configuration information (comprising an identifier and an association associating that identifier with at least one resource element not used for transmission on the desired downlink channel)—will now be described with reference to FIG. 6. In the present case, the method is implemented by the code 35 when executed on the modem processor 33. The method involves the serving eNB 104 actively signaling to the UE 102 associations between IMRs and identifiers of the interfering eNBs 108/interfering cells 109, and the UE using this signaled information to accurately estimate transmission parameters of interfering cell(s) by performing a blind detection procedure. The identifier of an interfering cell or transmission point may be in the form of reference data which is expected to be transmitted by that interfering cell as a reference symbol. Alternatively (or additionally), the identifier may be a cell ID of that interfering cell. A cell ID is a unique identifier assigned to e.g. an eNB, cell, or cell sector that uniquely identifies that eNB/cell/sector within the communication system 100. That is, Interference Measurement Resource (IMR) is explicitly linked (i.e. there is a signaled linkage) to a given identifier (e.g. reference symbol) of an interfering cell by way of active signaling. Certain key aspects of the method can be summarized as follows:

An IMR is configured for the UE performing inter-cell interference cancellation. The novel idea is here to link/associate this IMR to a given interfering cell:
  The linkage may be established to the interfering cell (or transmission point) reference symbols, e.g. CRS or CSI-RS.
  The linkage may also indicate the quasi-colocation (QCL) of the reference symbol associated to the IMR with the actual interference to be measured over the IMR. As defined in TS 36.211, two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay.
  In one embodiment, the IMR may be linked to more than one interfering cell or transmission point. For example, the following exemplary scenarios are envisaged (these are exemplary and alternatives will be apparent):

a) One IMR is configured associated with 1 eNB identifier (most likely the dominant interferer for that UE)—an example is illustrated in FIG. 13A which shows a serving cell (zero power) IMR 706a associated with one eNB identifier 1304a. In this example, the UE estimates channel state information accounting for an incoming interference transmission originating at the eNB (identified by identifier 1304a) and observed from the IMR 706a—it does not take into account any other interference transmission(s) if present.

b) Two (or more) IMRs are configured, each being associated with a distinct eNB identifier (most likely the two (or more) most dominant interferers for that UE)—an example is illustrated in FIG. 13B which shows a first serving cell (zero power) IMR 706b and a second (zero power) IMR 706c associated with a first eNB identifier 1403b and a second eNB identifier 706c respectively. In this example, the UE may estimate two sets of channel state information:

i) first channel state information accounting for a first incoming interference transmission originating at the first eNB (identified by the identifier 1304b) and observed from the first IMR 706b—in estimating the first channel state information, it does not take into account any interference transmission originating at the second eNB (identified by identifier 1304c) if present, nor any other interference transmission(s) if present;

ii) second channel state information accounting for a second incoming interference transmission originating at the second eNB (identified by the identifier 1304c) and observed from the second IMR 706c—in estimating the second channel state information, it does not take into account any interference transmission originating at the first eNB (identified by identifier 1304b) if present, nor any other interference transmission(s) if present. That is, there may be multiple IMRs, each associated with a respective interference source, and individual CSI respectively reported for each of these associations (i.e. 1 CSI for each IMR). This may allow testing of multiple CSI hypothesis (a.k.a. interference emulation with different emulated hypotheses).

c) One IMR is configured and associated with 1 or more eNB identifiers (this may require blind parameter estimation from multiple interferers)—an example is illustrated in FIG. 13C which shows one serving cell (zero power) IMR 706d associated with two eNB identifiers 1304d(i) and 1304d(ii). In this example, the UE estimates channel state information accounting for respective incoming interferences transmissions originating from each of the two eNBs (identified by identifiers 1304d(i),(ii)) and observed from the IMR 706d—it does not take into account any other interference transmission(s) if present.

The UE uses the IMR resources and associated interfering cell channel estimate—which, importantly, is obtained using the received identifier (see below)—to blindly detect the interferer transmission parameters over the IMR resources, e.g.:

Interferer transmission mode (or transmission scheme)
Interferer PMI and rank
Interferer modulation order Additionally, the UE may be signaled further information or restrictions on the interference characteristics in order to reduce UE blind detection complexity and increase blind detection performance. For instance:

Wideband or configurable sub-band size for which the UE may assume that the interference characteristics are the same, which increases the number of samples available to the UE for blind interference parameter detection.

Assumption that interference is always present (or alternatively not present) over the IMR resources. In this way the UE is not required to blindly detect the presence of structured interference over the IMR resources.

Assumptions on interferer PDSCH-to-pilot power ratio in order to derive CSI.

Parameter restrictions: the UE may be configured restricted sets of parameters in order to reduce complexity/improve blind detection performance, e.g.

Restricted sets of transmission modes or transmission schemes (e.g. {TM2, TM3} or {TM9} or {TM2, TM9}, or any other combination of transmission modes or transmission schemes Once the UE has blindly estimated the interferer transmission parameters, it may derive the CSI and report it to the eNB.

We further note that the IMR may be configured regardless of the transmission mode of the serving cell PDSCH, e.g. whether it is CRS or DM-RS based. Likewise, the IMR may be configured regardless of the transmission mode(s) in use or emulated by the interfering cells. Additionally, when the interference originates from a DM-RS based transmission mode, although the precoding may be arbitrarily set by the interfering eNB (in some cases, precoding may not even make use of specified codebooks), it is assumed for the purpose of CSI feedback, in the emulated interference case, that emulated interference could make use of specified precoding codebooks. In such a way the UE may detect the corresponding precoding matrix as part of the process of identifying the equivalent transmission channel.

Additionally, more IMR resources could be configured to the UE while these could be associated to single identifier of an interference source. This could prove beneficial if more resources would be deemed needed for the blind estimation of the characteristics of that interference source.

At S602, the serving eNB 104 may transmit configuration information to the UE on a control channel, such as the PDCCH or EPDCH, but preferably as part of control plane information over PDSCH, because of the overhead and also due to the fact that the configuration may not need to be changed on a subframe basis (for instance, a victim UE sees a given set of interferers over an extended period of time). The control information may be transmitted using semi-static signaling e.g. at the RRC level (see FIG. 2). The eNB configures the UE with the IMRs intended for measurements (that is, zero-power IMRs), each IMR further associated with a reference, either CRS or CSI-RS, of an interfering cell.

The configuration information comprises a configuration of a number N of IMRs intended for interference measurements for different cells, and an association explicitly associating each IMR being with one or more identifiers. Each of those identifiers is an identifier of an interfering cell (e.g. 180a, 108b). The identifier of a cell may take the form of reference data (e.g. a pilot sequence or cell ID) known to be transmitted in that cell as a reference signal—either CRS or CSI-RS (i.e. UE is assumed to have also the CRS/CSI-RS configured)—as those reference data are unique to the cell in which they are transmitted. Thus the UE can match the received reference data to the particular interfering cell transmitting that data as a reference signal.

In some embodiments, at S604, for each associated interfering cell (the identifiers of which have been signalled to the UE), the eNB 104 transmits control signals to that interfering cell (e.g. via the X2 interface) in order to control transmission parameters of that interfering cell at a time that coincides with the IMR with which that interfering cell is associated. That is, the eNB 104 actively controls the nature of the signals transmitted by the associated interfering cell during the associated IMR window, and thus actively controls the characteristics of the interference observed by the UE 102 in that window (as these are reflected on the serving cell IMR at the UE). This is referred to at the serving cell "emulating" the interference reflected on the IMRs of the serving cell.

With emulated interference, first the eNBs negotiate/configure together over the X2 interface the location of the IMRs themselves, such that they coincide in time/frequency. The eNB 104 controlling the emulation hypotheses is only one option that would fall into the category of "distributed" NAICS operation. Alternatively, a central entity (not shown in FIG. 1A or 1B) e.g. in the form of central scheduler communicatively coupled to the eNBs 104, 108a, 108b could be deployed within the communication system 100. The central entity could be configured to control together the eNBs 104, 108a and 108b and it would be in charge of the emulation of the interference hypotheses and global scheduling over the eNBs it has control over.

The eNB may configure the same IMR also in the interfering cell. In addition, the eNB may choose transmission parameters to be emulated within the IMR per IMR subframe and subband (or also possibly wideband). The parameters would be based on eNB's best prediction of which parameters might be utilized in the coming subframes. Alternatively, if multiple IMRs are configured and these would be associated to the same identifier, the eNB could test simultaneously (i.e. in the same subframe), multiple interference transmission hypotheses (e.g. in terms of interference rank, PMI, modulation), assuming testing one hypothesis per configured IMR. The UE would then compute and report CSI for each of the hypotheses, identifying the interference parameters corresponding to each of the hypotheses into the reported CSI. One the eNB or a central entity controlling multiple eNBs has the knowledge of all the reports from all the UEs it had requested reports from, it may perform a scheduling decision by jointly selecting the UEs and corresponding transmission hypothesis which for instance maximizes the overall system throughput. Alternatively, if multiple transmission hypotheses are tested (for instance with QPSK, 16QAM and 64QAM modulation), the eNB may gain understanding of how the UE receiver behaves in the face of different types of interference, which in turn would help improving the scheduling decisions.

This is illustrated in FIG. 7A which shows exemplary contemporaneous resource element usage by the serving cell (left-hand side) and the interfering cell (right-hand side). Specifically, FIG. 7A is an Illustration of the transmission (one PRB) in the serving and in the interfering cell in case the interfering cell emulates the interference reflected on the IMRs of the serving cell. IMRs are configured also for the UEs in the interfering cell such that the transmission format reflected on those REs may be different from the one used for PDSCH in the interfering cell (as the UEs are rate matching around the IMRs). By transmission format, we refer for instance to one or more of, but not limited to, transmission mode, transmission scheme, transmission rank, PMI, modulation format. The serving eNB is thus free to choose for which interfering transmission parameters the CSI should be computed by the UE.

That is, the serving eNB (or the central entity) controlling one of the interfering cells (or transmission point) selects interference parameters (transmission mode, transmission scheme, PMI, RI, modulation order etc.) for which the UE should provide CSI, and causes the interfering cell to transmit emulated interference according to these selected parameters on the same resource elements as the IMRs configured for the NAICS UEs.

This provides the eNB with a mechanism to control the UE assumption about the interference, e.g. the eNB can basically request CSI for a case that a specific TM, PMI, RI and modulation order are used in the interfering cell by emulating the interference with the desired parameters in the interfering cell. This requires that the eNB configures the same IMR for all UEs also in the interfering cell so that any transmission format can be used on those REs, without restricting scheduling (i.e. without having to actually transmit PDSCH to UEs in the same cell with those parameters).

In this mode of operation, the eNB controlling one or more of the interfering cells coordinates both the configuration of the IMR, and also the interference parameters in multiple cells. This is mainly applicable in scenarios where fast coordination is possible with a high capacity and low latency backhaul and centralized control (e.g. single eNB controlling all the cells), as otherwise the required coordination becomes quite difficult due to backhaul limitations.

In another embodiment, only the configurations of the IMRs and the type of IMR (i.e. whether it is empty or contains emulated interference) are coordinated across multiple cells, while the interference parameters of the emulated interference are still autonomously selected by the interfering cell. Such operation would facilitate blind detection of interference parameters from a controlled set of interfering cells. The latency requirements of this operation mode may be less stringent than in the preceding case.

In yet another embodiment, emulated interference is not effected at all. The interference reflected on the IMRs reflects the transmission parameters used for the interfering PDSCH transmission in the interfering cell. This is illustrated in FIG. 7B. FIG. 7B is an Illustration of the transmission in the serving cell (left-hand side) and in the interfering cell (right-hand side) in case there is no interference emulation in the interfering cell. In this case the actual PDSCH transmissions in the interfering cell will be reflected in the CSI reports measured from the IMRs of the serving cell.

In this case the eNB will receive CSI that reflects the interference (and the used interfering PDSCH transmission parameters) in the subframe with the IMR. This might or might not fully reflect the interference faced during the actual PDSCH transmission, as is the case with current CSI reporting in LTE.

This is applicable also to non-coordinated scenarios with multiple eNBs connected possibly with a non-ideal (high latency, low capacity) backhaul. One advantage of this mode of operation is that the serving cell signal is not present over IMR resources in the serving cell, which greatly simplifies interferer parameter estimation.

In all cases (emulated interference and no emulated interference), IMRs are explicitly linked to specific interfering cells by way of the association signalled by the serving eNB.

Exemplary Signalled Associations

Figure 7E:
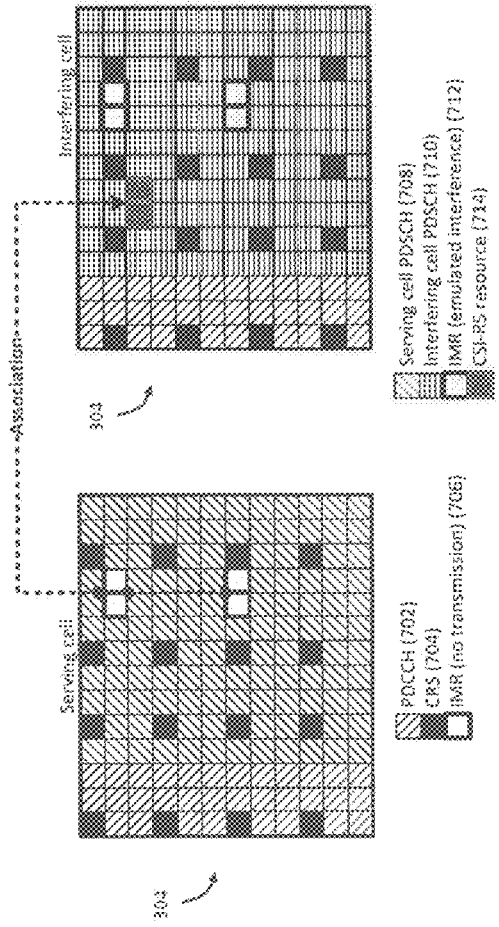
FIG. 7A is a schematic illustration of resource usage in an emulated interference scenario.
FIG. 7B is a schematic illustration of resource usage in a non-emulated interference scenario.
Figure 7F:
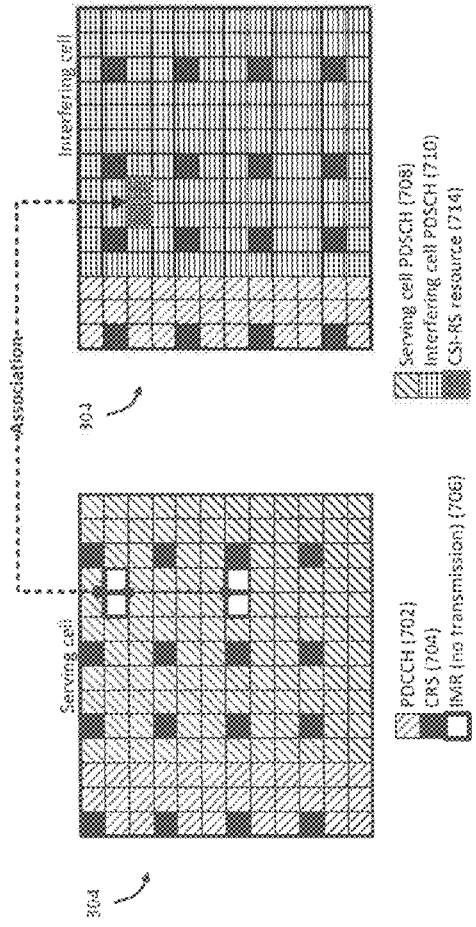

Examples of associations that may be signalled to the UE in the configuration information are shown in FIGS. 7D-F (the association is illustrated conceptually by the dashed lines labelled "Association" in these figures):

1) An association to an IMR 706 in the serving cell to CRS ports 704 in the interfering cell (illustrated in FIG. 7C for the emulated interference case, and FIG. 7D for the non-emulated interference case). Here, the CRS is the identifier of the interference source.

2) An association to an IMR 706 in the serving cell to a given CSI-RS resource 714 in the interfering cell (illustrated in FIG. 7E for the emulated interference case, and FIG. 7F for the non-emulated interference case). Here, the CSI-RS is the identifier of the interference source.

These are examples, and these don't exclude the general case of an association to an identifier (e.g. cell ID) of the interfering. The cell ID may be used e.g. to allow the UE to get access to the corresponding RS for channel estimation, since for instance RS resources and sequences may be linked to the cell ID.

At S606, the UE 102 receives (in a configuration phase) the NAICS configuration (e.g. via higher layer signaling) from the eNB, transmitted at step S602.

That is, in the "configuration phase", the UE receives an explicit association between a resource element for which downlink transmissions are 'muted' and an identifier of a source of interference (i.e. interfering eNB in this case). Using the terms in the LTE standard, the UE would be configured with one or more CSI-IM, and according to the embodiments of this disclosure, each of the configured CSI-IM would be explicitly linked with an identifier of the corresponding source of interference. For non-emulated interference, this identified source of interference is typically expected to be the dominant interferer at that point (or at least one of a number of dominant interferers all associated with that resource element), which the network may infer for instance from UE reported reference symbol received power (RSRP) reports corresponding to different cells the UE is configured to measure and report.

For the emulated interference case, nearby sources of interference not associated with that resource element are still transmitting when the serving cell is muted (i.e. during the zero-power transmission), and those transmissions from non-associated interferers are reflected in the serving cell IMRs when present. This allows the UE to factor the corresponding interference terms (not mitigated by the UE receiver) into to the CSI.

The reported CSI intended to reflect a situation in which the UE is mitigating a specific type of interference from the associated interferers only, and is not making any effort to mitigate interference from non-associated interferes. The idea is that non-mitigated interference still needs to be accounted for, e.g. as equivalent AWGN power or covariance matrix for the remaining interference. Otherwise the reported CQI would be too optimistic.

Some interference will not be mitigated e.g. because the UE does not have enough resources to mitigate interference from every eNB. Inter-cell IC is very complex and scales exponentially with the number of transmission layers (serving+interfering) if joint ML detection is considered.

Thus, in this scenario, the serving cell wants the UE to estimate, from an IMR, transmission parameters for only that/those interferers associated with that IMR (and to ignore any other active sources of interference). Indeed, in practice, the other active sources of interference may not be that dominant and may be factored into the CSI as e.g. additional noise.

Estimating transmission parameters for the right interferer may require some pre-processing. However, by linking the IMR to an identifier of the source of the interference, we simplify UE blind detection of the interference. In a nutshell, in an exemplary processing (which has been successfully simulated—see results below) the UE estimates the channel from the associated source of interference and tries multiple hypotheses for a transmission originating from that interferer. It then selects according to some criterion (e.g. ML or approximate ML) the hypothesis which is deemed the closest to the received signal samples over the IMR resources.

At step S608, for each interfering cell identified to the UE in the signalled configuration information, the UE 102 estimates (in an estimation phase) the channel from the CRS or CSI-RS received from that interfering cell. The UE is able to perform this channel estimate because it knows what reference data is encoded in the CRS/CSI-RI transmission (as this has been signalled to the UE in association with an IMR in the configuration information), and can thus compare the known reference data to the received signal and determine the channel estimated based on this comparison.

This in part facilitates the blind detection of the transmission parameters at S610 (see below).

At S610, in a subframe intended for CSI measurement, the UE performs (in the estimation phase) the blind detection procedure (based on the channel estimate of S608) to blindly estimate the interfering PDSCH transmission parameters from the IMR resource elements.

Most of the considered algorithms for blind interference parameter estimation (e.g. those mentioned above) require, for each transmission hypothesis they are testing, the knowledge of the "effective" channel between the source of interference and the victim UE. "Effective channel" means the precoded channel (raw channel as observed from the RS x transmission precoding scheme which can be e.g. a given PMI). Knowing the raw channel estimate towards the interferer allows the UE to make hypotheses on the effective channel. Thus, some algorithms of this type would not work without the raw channel estimates. Also, it would be very complex for the UE to test one by one (and for which transmission hypothesis) all the potential effective channels by trying to form them from each of the nearby interference sources. Knowing the association to a specific interference source greatly simplifies this task.

That is, the blind detection procedure makes use of the signaled identifier as knowing the identifier allows the UE to estimate the raw channel from the interferer reference symbols (as the identifier would allow the UE to identify the RS positions, sequences, etc.). Once the raw channel (i.e. not precoded) is obtained, the UE may form hypotheses on the possible effective channels (e.g. applying different PMIs) as part of the blind detection.

The UE may, optionally, also receive at S606 (in the configuration phase) additional parameters on the signaling channel helping to assist in blind estimation of transmission parameters, e.g. any restricted subset of any of the transmission parameters. This leaves the UE with fewer remaining unknown parameters to estimate blindly, thereby enabling more accurate estimation of the unknown parameters.

In summary, the signaled association between the identifier of the interference source and the serving cell IMR indicates to the UE that it should look for an interference signal (interference transmission) from that interference source reflected in that IMR (that is, it indicates to the UE that it should look for an interference signal from that interference source when the serving cell is muted over that resource element). Additional signaled information (signaled on the or another signaling channel) may be used to tell the UE to expect such a signal, or the UE may infer this (i.e. the presence or absence of such a signal) using blind estimation, as discussed above. When present, such a signal may be used to infer further transmission characteristics of the interference source (e.g. one or more of those listed above). The identifier itself provides, albeit indirectly, information about expected properties of that interference signal when present by the time it is received at the UE (as that identifier enables the UE to determine characteristics of the effective channel over which that interference signal has propagated), which enables efficient estimation of the transmission characteristics (presence/absence of such a signal, transmission scheme etc.). Thus, based on the received identifier and the received association, the UE can isolate that interference signal when present from any other signals observed from the serving cell IMR such as interference from other interference sources and/or noise etc. (and optionally infer the presence/absence of such a signal in the presence of such other signals) as it a) at least knows to look for this this interference signal (as this is indicated by the association between the interferer and the IMR) and b) can assume characteristics of the effective channel over which that interference channel would have propagated (by estimating characteristics of the effective channel using the identifier itself as described above).

At S612, based on the interference and channel estimates, the UE derives (in the estimation phase) CSI.

As will be apparent, there are a number of ways in which the UE can derive the CSI based on the interference and channel estimates. For instance, the UE may perform local interference mitigation on reference symbols transmitted from the serving cell (e.g. CRS/CSI-RS), and then estimates the CSI based on the interference mitigated reference symbols. Alternatively or additionally, the UE may for instance perform interference mitigation over the IMR resources, and/or use a look up table which provides the receiver IC gain as a function of the interference parameters, etc.

As S614, the UE reports (in a reporting phase) the CSI in uplink on PUCCH or on PUSCH as an uplink report. The eNB receives from the UE the CSI report over the uplink.

At S616, the eNB schedules the UE utilizing the CSI report for link adaptation. That is, the serving eNB transmits desired signals encoding useful data to the UE 102 e.g. on the PDSCH on based (that is, taking into account) the reported CSI.

At S618, the US 102 receives these desired signals and performs receiver-side interference mitigation thereon. Advantageously, because the reported CSI has accurately taken into account the UEs ability to perform this receiver-side interference mitigation (this accuracy having been achieved by way of the active signaling of associations between interfering eNBs and serving cell zero-power IMRs), the receiver-side interference mitigation complements the transmission control effected by the base station, avoiding the undesirable conflicts between the two procedures detailed above. In other words, the accurate CSI reporting means the transmission is adapted to match the UE's receiver-side interference mitigation ability.

As a proof of concept, numerical simulations were conducted in order to assess the feasibility of the proposed solution, i.e. that UE may blindly detect the transmission parameters of the interfering cell over a limited set of samples.

The performance of blind detection of PMI, transmission rank and modulation order of one interfering cell was investigated in simulation. An near-ML detection strategy was implemented, which extends the blind estimation of modulation order, presented in [7][8] and references therein, to PMI and transmission rank detection.

The provided results assume the following exemplary situation:

Two cells are explicitly modelled, each having two antenna (CRS) ports

The UE is equipped with 2 receive antennas

Wireless propagation conditions assume extended Vehicular-A channel model with 5 Hz Doppler frequency.

The serving cell CRS signal-to-noise ratio (SNR) is set as SNR=10 dB

One interfering cell is explicitly modelled in addition to the serving cell:

Serving and interfering cell CRS are colliding together

The UE receiver performs CRS-IC in order to enhance the quality of the channel estimates for both the serving and the interfering cells In this example, the interfering cell uses fixed TM4 transmission mode with random and uniformly distributed transmission rank (1 or 2) and PMI. The modulation is fixed to 16QAM.

One IMR resource is configured in the serving cell:

IMR REs are muted in terms of transmission in the serving cell.

The interference parameters are set to remain constant over a sub-band size of 6 PRB, which means that 4 RE per PRB×6 PRB=24 RE are available in total for interferer parameter estimation.

In this example, assuming a TM4 type of interfering signal, the UE blindly estimates the following transmission parameters of the interfering cell over the IMR resources:

Transmission rank (1 or 2);

PMI index (4 indices for rank-1, 2 indices for rank-2);

Modulation order (QPSK, 16QAM, 64QAM), independently for each transmission layer of the interfering cell.

Figure 9:
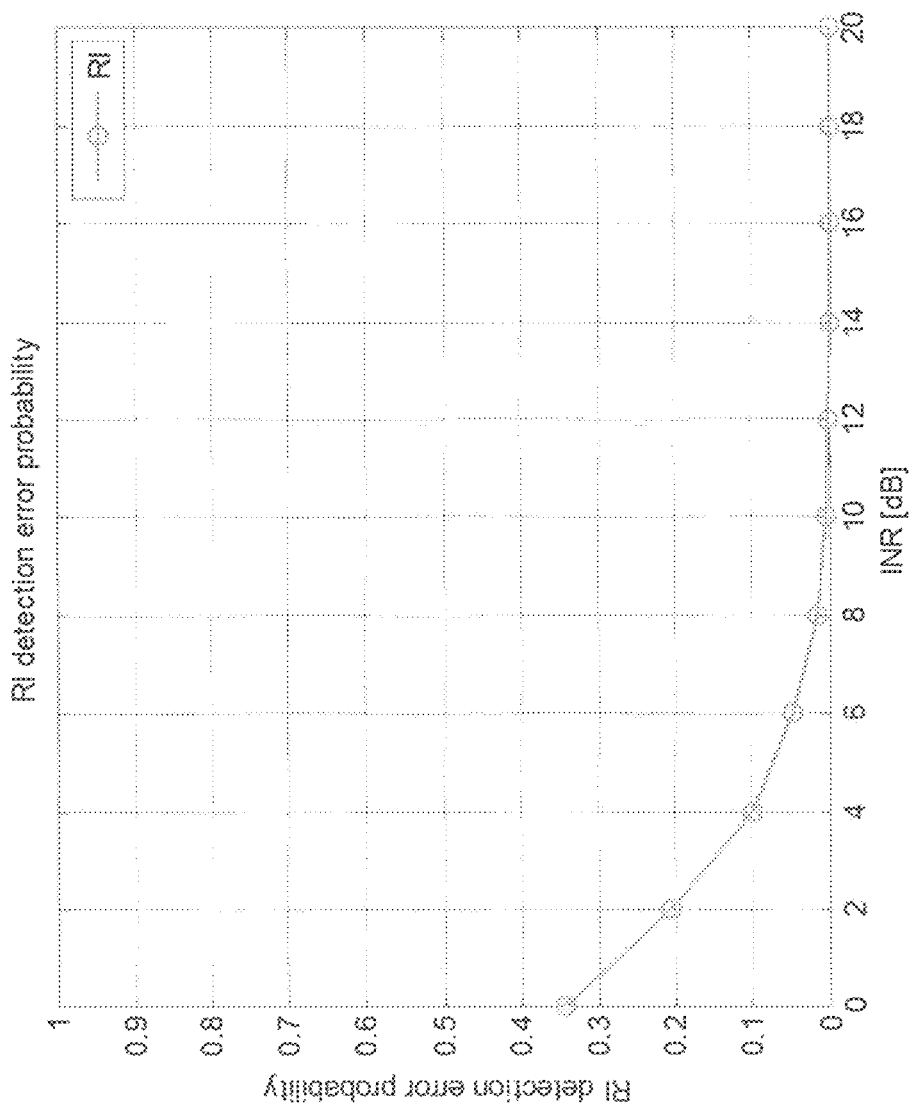
Figure 10:
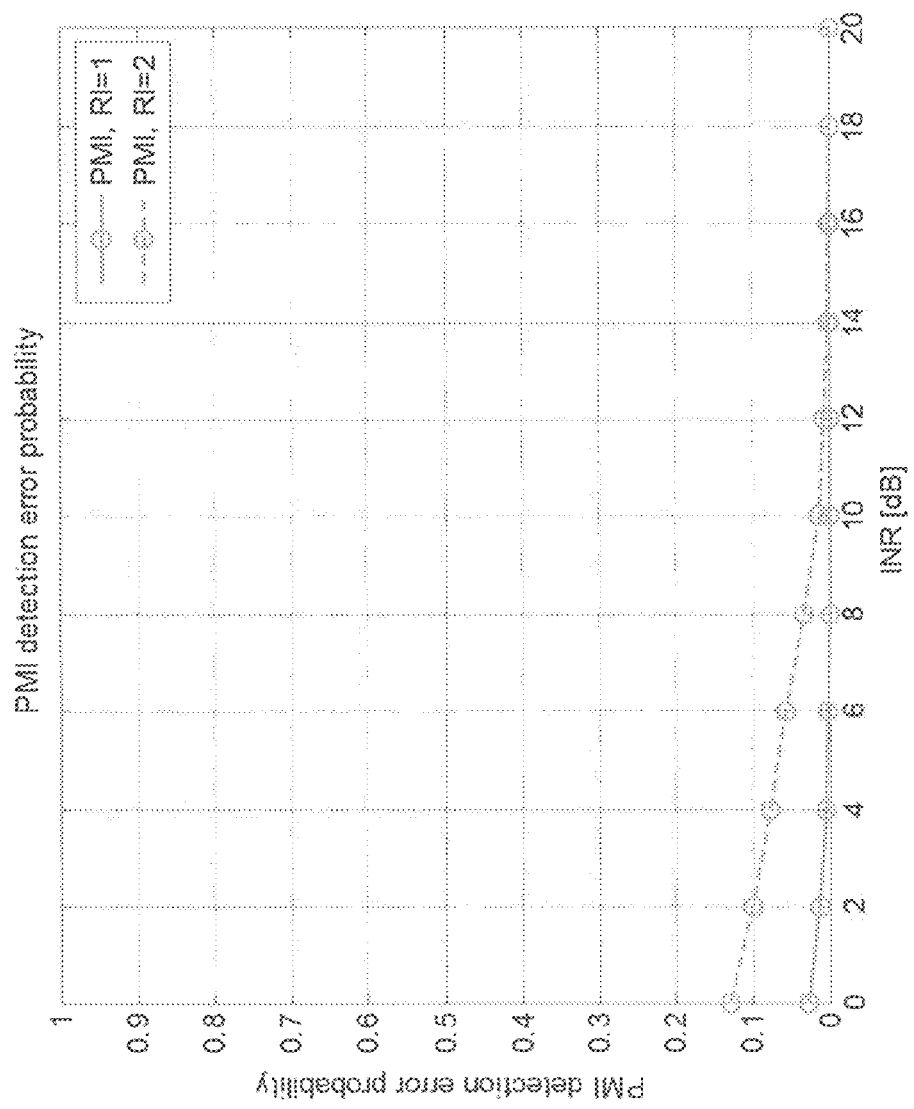
Figure 11:
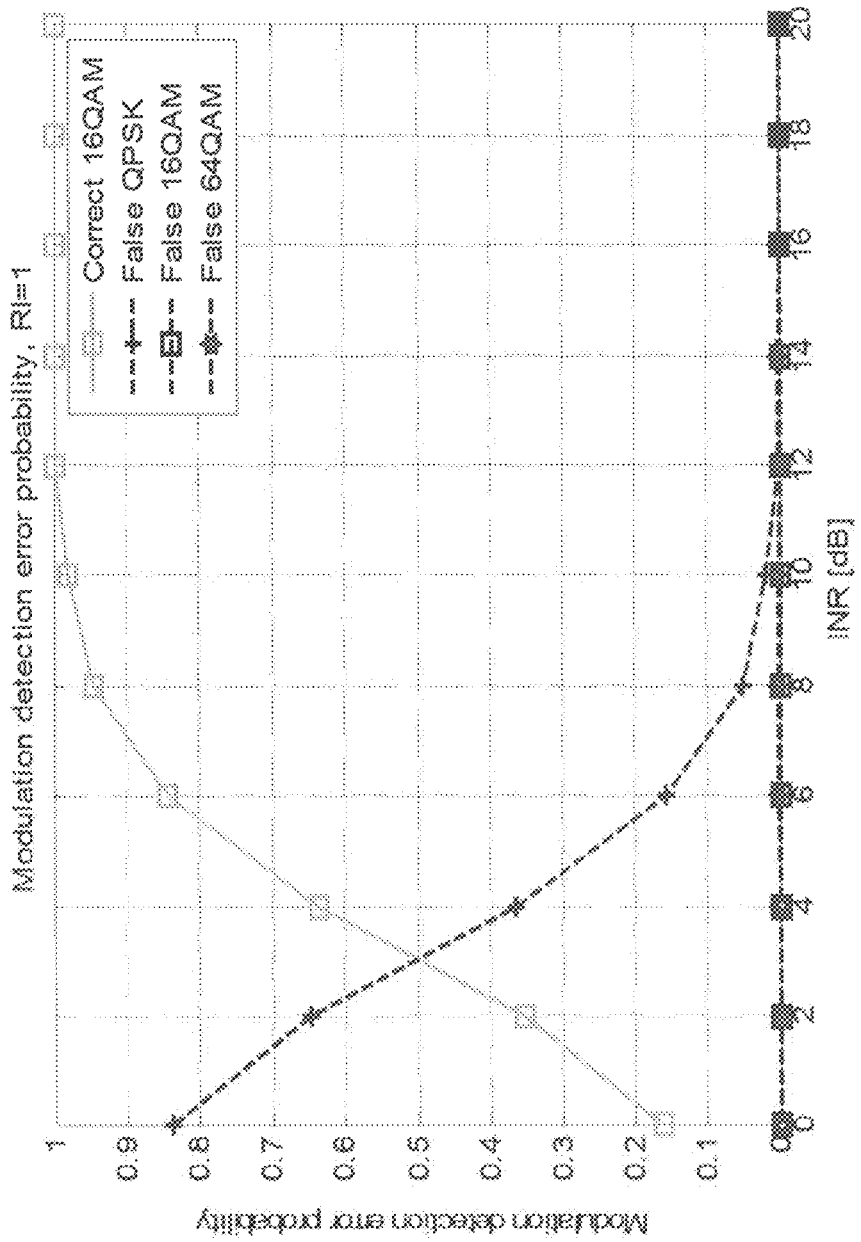
Figure 12:
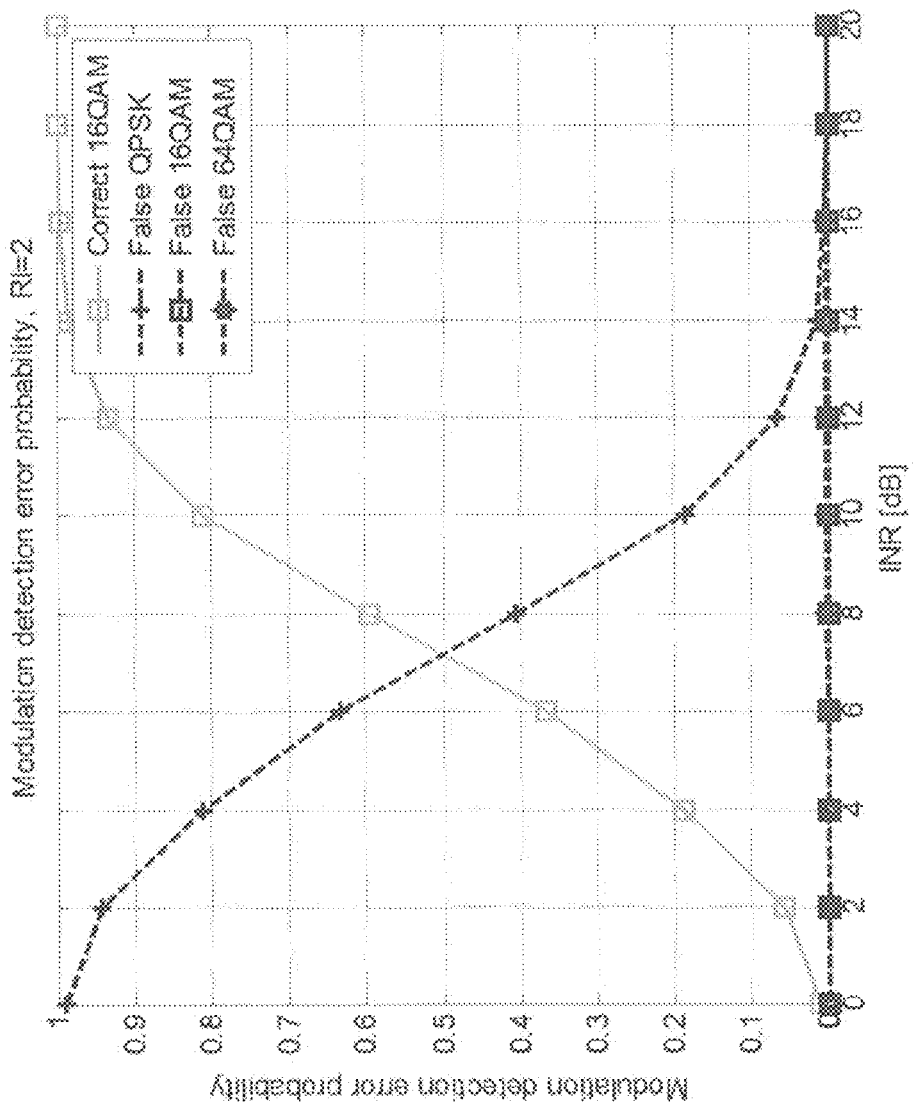

Performance of UE blind detection for the above-mentioned interfering cell parameters is depicted in FIGS. 9-12. FIG. 9 is a graph showing interfering cell rank detection error probability; FIG. 10 is a graph showing interfering cell PMI detection error probability; FIG. 11 is a graph showing interfering cell modulation order detection error probability (rank=1); FIG. 12 is a graph showing interfering cell modulation order detection error probability (rank=2).

It is observed that despite the very small number of resources (24 RE) used for interferer parameter estimation, the detection performance is deemed satisfactory when the dominant interferer power level is greater or equal to 8 dB, which is of the same order than the interference levels considered in 3GPP studies [2].

It is also noted that the detection error probability may have different impact in terms of user data throughput depending on the considered parameter. For instance, a falsely detected 64QAM interferer may have little impact if the interferer is transmitting in fact with a lower modulation order: in that case there would always exist a 64QAM constellation point close enough to the true interferer modulation point when performing joint serving and interferer signal detection. On the contrary, a false QPSK detection may have more severe impact in terms of throughput since it would introduce errors with larger magnitude in the reconstructed interference signal during joint detection. One solution to avoid false QPSK detection would be to remove QPSK modulation from the candidate sets of modulations blindly estimated at the UE.

Increasing the estimation bandwidth or alternatively configuring additional IMR resources would yield further improved performance. Another or additional way to enhance detection performance would be to signal to the UE restrictions on the parameters to be estimated which in turns reduces the number of hypotheses and improves at the same time reliability of the detection.

In [5] it was proposed that the UE estimates the interference coming from outside the serving and the interfering cells that are to be cancelled by the UE receiver. Additionally, the UE gets semi-statically signaled transmission parameters that should be assumed in CSI computation for the interfering cells to be cancelled. The main difference is that in the case at hand the eNB has full freedom to reflect dynamically any transmission parameters in the IMR since the UE estimates them blindly, whereas in [5] the parameters cannot be changed on the fly. Thus, the approach in [5] is actually very restrictive as it requires that the eNB transmits exactly with the semi-statically configured parameters in order for the CSI to match with the actual interfering transmission.

It is noted again that, in accordance with the present disclosure, IMRs are here explicitly linked with interfering cells, which is not the case with the specified CoMP operation. This leads to the following benefits (among others):

More accurate CSI feedback compared to existing mechanisms, in particular the pessimistic CSI problem is avoided, and the full gains of NAICS can be obtained.

Since the serving cell mutes its transmission over the IMR resources, the UE may observe the interference over the IMR without the self-interference from the serving cell signal. This greatly improves blind detection performance and decreases its complexity at the same time since the serving cell signal does not need to be hypothesized over.

Flexibility on network side to emulate or inject various interference hypotheses, without the constraints associated to signaling.

The CQI definition for a NAICS receiver is future proof. There is no need to introduce new RRC signaling bits for CQI hypotheses, e.g. if new transmission modes or transmission schemes are introduced in future releases of the LTE standard.

Possibility to implement coordinated NAICS operation in the network.

It will be appreciated that the above embodiments have been described only by way of example, and other variants or applications may be apparent to a person skilled in the art given the disclosure herein.

For instance, while embodiments above have been described in relation to certain standards such as LTE networks and so forth, these are not intended to be limiting and the present disclosure may in fact be applied within any communication standard of any communication network. Further, whilst in the above, the method of FIG. 6 is implemented substantially in software, the method may alternatively be implemented in hardware or a combination of both hardware and software.

The scope is not limited by the described examples but only by the following claims. Moreover, those skilled in the art to which this application relates will appreciate that other and further additions, deletions, substitutions and modifications may be made to the described embodiments.

What is claimed is:

1. A method of providing channel state information for a desired downlink channel of a wireless communication system, the method comprising:
   in a configuration phase, receiving on a signaling channel configuration information comprising an identifier of an interference source and an association which associates the identifier with at least one resource element not used for transmission on the desired downlink channel;
   in an estimation phase, estimating channel state information for an expected transmission on the desired downlink channel accounting for an incoming interference transmission from the identified interference source as observed from the at least one resource element; and
   in a reporting phase, reporting the channel state information.

2. A method according to claim 1 comprising storing the received association and, in the estimation phase, accessing the stored association to identify the interference source.

3. A method according to claim 1 comprising, in the estimation phase, determining a channel estimate for the identified interference source using the configuration information, the channel estimate being used to estimate the channel state information.

4. A method according to claim 3 comprising determining from the channel estimate one or more characteristics of an effective channel on which the interference transmission is transmitted.

5. A method according to claim 4 wherein the effective channel is precoded and the channel estimate is for a non-precoded channel.

6. A method according to claim 5 wherein the identifier identifies a characteristic of a reference signal which is transmitted by the interference source and the method comprises receiving the reference signal from the interference source, the channel estimate being determined based on the detected reference signal and the identified characteristic of the reference signal.

7. A method according to claim 1, wherein the estimation phase further comprises determining one or more characteristics of interference from the identified interference source based on the observed interference transmission, the channel state information being estimated based on the determined characteristics of interference.

8. A method according to claim 7, wherein the characteristics of interference are determined based on the observed interference transmission and a determined channel estimate.

9. A method according to claim 7, wherein the characteristics of interference comprise at least one of: a presence or absence of interference from the identified interference source, transmission mode, transmission scheme, transmission rank, precoding matrix index, estimated precoding matrix, modulation order and pilot-to-data power ratio.

10. A method according to claim 9 comprising receiving, on the or another signaling channel, at least one of the characteristics of interference that may be assumed over the resource element, and estimating at least another of the characteristics of interference based on that assumption.

11. A method according to claim 1, wherein the configuration information comprises a plurality of interference source identifiers, for each identifier, and an association which associates that identifier with at least one respective resource element not used for transmission on the desired downlink channel.

12. A method according to claim 11 comprising, for each identified interference source, estimating respective channel state information accounting for a respective incoming interference transmission observed from the at least one respective resource element associated with that interference source.

13. A method according to claim 12 comprising determining a respective channel estimate for that interference source using the identifier of that interference source, that channel estimate being used to estimate the respective channel state information for that interference source.

14. A method according to claim 1, wherein the configuration information is transmitted on the signaling channel using semi-static signaling.

15. A method of adaptive transmission on a downlink channel of a wireless communication system, the method comprising:
- in a configuration phase, transmitting to a downlink receiver on a signaling channel configuration information comprising an identifier of an interference source and an association which associates the identifier with at least one resource element not used for transmission on the downlink channel;
- in a reporting phase, receiving channel state information from one or a plurality of downlink receivers; and
- in a transmission phase, transmitting on a downlink channel utilizing one or more transmission parameters selected according to the received channel state information.

16. A method according to claim 15, wherein the configuration information comprises a plurality of interference source identifiers, and for each identifier, an association which associates that identifier with at least one respective resource element not used for transmission on the downlink channel.

17. A method according to claim 15, wherein the transmission phase further comprises transmitting emulated interference from the identified interference source on the associated at least one resource element.

18. At least one non-transitory computer readable medium storing code which, when executed on a processor performs the following:
- in a configuration phase, transmitting to a downlink receiver on a signaling channel configuration information comprising an identifier of an interference source and an association which associates the identifier with at least one resource element not used for transmission on the downlink channel;
- in a reporting phase, receiving channel state information from one or a plurality of downlink receivers; and
- in a transmission phase, transmitting on a downlink channel utilizing one or more transmission parameters selected according to the received channel state information.

19. A user equipment device for providing channel state information for a desired downlink channel of a wireless communication system, the user equipment device comprising:
- a processor on which a channel state information code is implementable;
- a memory coupled to the processor for storing the channel state information code stored hereon;
- a modem coupled to the processor having a wireless receiver coupled to an antenna and configured, to transmit and receive a signal that is processed by the processor upon execution of the channel state information code;
- an estimation code executable on the processor and stored on the memory and configured, in an estimation phase, to estimate channel state information for an expected transmission on the desired downlink channel accounting for an incoming interference transmission from the identified interference source as observed from the at least one resource element; and
- a reporting code executable on the processor and stored on the memory and configured, in a reporting phase, to report the channel state information.

20. A transmitter device for adaptive transmission on a downlink channel of a wireless communication system, the transmitter device comprising:
- a cell base station transmitter configured, in a configuration phase, to transmit to a downlink user equipment on which a channel state information code is implementable and on a signaling channel configuration information comprising an identifier of an interference source and an association which associates the identifier with at least one resource element not used for transmission on the downlink channel; and
- a cell base station receiver coupled to an antenna and configured, in a reporting phase, to receive channel state information from one or a plurality of downlink user equipment receivers;
- wherein the cell base station transmitter is configured, in a transmission phase, to transmit on a downlink channel utilizing one or more transmission parameters selected according to the received channel state information.

* * * * *